(12) United States Patent
Normann et al.

(10) Patent No.: US 9,209,495 B2
(45) Date of Patent: Dec. 8, 2015

(54) SYSTEM AND METHOD FOR THE THERMAL MANAGEMENT OF BATTERY-BASED ENERGY STORAGE SYSTEMS

(75) Inventors: Randy Allen Normann, Edgewood, NM (US); Guy Letendre, Ogden, UT (US)

(73) Assignee: LAVA ENERGY SYSTEMS, INC., Albuquerque, NM (US)

(*) Notice: Subject to any disclaimer, the term of this patent is extended or adjusted under 35 U.S.C. 154(b) by 1503 days.

(21) Appl. No.: 12/732,073

(22) Filed: Mar. 25, 2010

(65) Prior Publication Data

US 2010/0243017 A1 Sep. 30, 2010

Related U.S. Application Data

(60) Provisional application No. 61/163,154, filed on Mar. 25, 2009, provisional application No. 61/275,177, filed on Aug. 26, 2009, provisional application No. 61/269,799, filed on Jun. 29, 2009, provisional application No. 61/336,668, filed on Jan. 25, 2010.

(51) Int. Cl.
| | |
|---|---|
| *H01L 35/30* | (2006.01) |
| *H01M 10/44* | (2006.01) |
| *H01M 10/63* | (2014.01) |
| *H01M 10/615* | (2014.01) |
| *H01M 10/6567* | (2014.01) |
| *H01M 10/66* | (2014.01) |
| *H01M 10/6561* | (2014.01) |
| *H01M 10/613* | (2014.01) |

(52) U.S. Cl.
CPC .......... *H01M 10/443* (2013.01); *H01M 10/613* (2015.04); *H01M 10/615* (2015.04); *H01M 10/63* (2015.04); *H01M 10/6561* (2015.04); *H01M 10/6567* (2015.04); *H01M 10/66* (2015.04)

(58) Field of Classification Search
CPC ....................................................... H01L 35/30
USPC ...................................... 136/205; 429/62, 120
See application file for complete search history.

(56) References Cited

U.S. PATENT DOCUMENTS

| | | | | |
|---|---|---|---|---|
| 3,986,362 | A * | 10/1976 | Baciu ............................ | 60/641.2 |
| 6,601,390 | B1 * | 8/2003 | Yazawa et al. .................. | 60/650 |
| 2006/0137349 | A1 * | 6/2006 | Pflanz .......................... | 60/641.2 |
| 2006/0201157 | A1 * | 9/2006 | Villalobos ...................... | 60/670 |

* cited by examiner

*Primary Examiner* — Susan D Leong
(74) *Attorney, Agent, or Firm* — Cooley LLP

(57) ABSTRACT

A system and method for the thermal management of a battery-based energy storage is described. One embodiment includes a thermal management system for a battery-based energy storage system, the thermal management system comprising a residual heat source, such as a geothermal heat source, and a battery-based energy storage system thermally connected to the residual heat source The thermal connection between the energy storage system and the residual heat source may be direct (i.e., the energy storage system may be adjacent to, partially located within, or fully located within the residual heat source) or indirect (e.g., the energy storage system and residual heat source may use a heat conduit to transfer heat). In embodiments using a heat conduit to transfer heat, the thermal management system may further comprise a control system for controlling the circulation of a fluid in the heat conduit in order to regulate the temperature of the energy storage system.

21 Claims, 23 Drawing Sheets (Prior Art)

(Prior Art)

Sodium sulfur battery schematic (Prior Art)

SYSTEM AND METHOD FOR THE THERMAL MANAGEMENT OF BATTERY-BASED ENERGY STORAGE SYSTEMS

PRIORITY

The present application claims priority to commonly owned and assigned application Ser. No. 61/163,154, filed Mar. 25, 2009, entitled Temperature Management in batteries such as Sodium-Sulfur Batteries; application Ser. No. 61/275,177, filed Aug. 26, 2009, entitled Liquid Heat Exchanger for Energy Storage; application Ser. No. 61/336,668, filed Jan. 25, 2010, entitled Energy Recovery System for Energy Storage; and application Ser. No. 61/269,799, filed Jun. 29, 2009, entitled Maintaining Battery Temperature with Waste Heat Created by Power Electronics, which are incorporated herein by reference.

FIELD OF THE INVENTION

The present invention relates to battery-based electrical energy storage. Specifically, the present invention relates to the thermal management and energy harvesting of large-scale battery systems.

BACKGROUND OF THE INVENTION

There are a number of inorganic battery technologies which offer advantages for the storage of energy in large scale systems. There are many types of molten salt batteries, of which sodium-sulfur is currently most important of these technologies. A sodium-sulfur battery is a type of battery constructed from sodium (Na) and sulfur (S). This type of battery has a high energy density, high efficiency of charge/discharge (99.0-99.6% Coulombic Efficiency) and long cycle life, and is fabricated from inexpensive materials. However, because of the operating temperatures of 110 to 350° C., based on the melting point of sodium, and the highly corrosive nature of the sodium polysulfides, such cells can be difficult to make practical in many applications. Most batteries operate more efficiently when operated at elevated temperatures. Some batteries use sodium requiring a molten state for battery operation. Naturally, sodium-sulfur batteries are favored for large utility scale energy storage systems where long-life of sodium-sulfur battery justify the cost of heating. Sodium-sulfur batteries require an operating temperature between 110° C. to 350° C. For optimum performance, current sodium-sulfur cell technology cells are normally operated between 290° C. and 340° C.

Another related battery technology is called the Zebra cell. The Zebra battery operates at 250° C. (482° F.) and utilizes molten sodium chloroaluminate (NaAlCl$_4$), which has a melting point of 157° C. (315° F.), as the electrolyte. Here again, the battery cells' lower operating temperature is limited by the melting temperature of the sodium chloroaluminate. Batteries produced from cells based on these technologies are difficult to make practical in many applications and normally result in lost energy required by continuous heating.

The cell of a sodium-sulfur battery is usually made in a tall cylindrical configuration. The entire cell is enclosed by a steel casing that is protected, usually by chromium and molybdenum, from corrosion on the inside. This outside container serves as the positive electrode, while the liquid sodium serves as the negative electrode. The container is sealed at the top with an airtight alumina lid. An essential part of the cell is the presence of a BASE (beta-alumina sodium ion exchange) membrane, which selectively conducts Na$^+$. The cell becomes more economical with increasing size. In commercial applications the cells are arranged in blocks for better conservation of heat and are encased in a vacuum-insulated box.

During the discharge phase, molten elemental sodium at the core serves as the anode, meaning that the Na donates electrons to the external circuit. The sodium is separated by a BASE cylinder from the container of sulfur, which is fabricated from an inert metal serving as the cathode. The sulfur is absorbed in a carbon sponge. BASE is a good conductor of sodium ions, but a poor conductor of electrons, so avoids self-discharge. When sodium gives off an electron, the Na$^+$ ion migrates to the sulfur container. The electron drives an electric current through the molten sodium to the contact, through the electrical load and back to the sulfur container. Here, another electron reacts with sulfur to form S$_n^{2-}$, sodium polysulfide. The discharge process can be represented as follows:

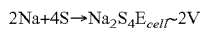

$$2Na+4S \rightarrow Na_2S_4 E_{cell} \sim 2V$$

As the cell discharges, the sodium level drops. During the charging phase the reverse process takes place. Once running, in a well-designed battery system, the heat produced by charging and discharging cycles can be sufficient to maintain operating temperatures and usually no external source is required.

Previous sodium-sulfur batteries rely on self-heating of the battery, which is generally available only during charge or discharge cycles. Further, the charge or discharge rate is often determined by the requirements of the external power system, and often it is not practical to change charge or discharge rates solely for battery temperature control. A separate source of heat is therefore generally employed, often either an electric heater or a solar heater. Electric heating of the battery consumes energy that would otherwise be available to distribute. Solar heating relies on exposure to sunlight which can be inconsistent, and can limit the size of the battery array, and can cause undesirable thermal cycling of the batteries.

The challenges posed by the required high operating temperatures are evident from U.S. Pat. No. 6,958,197. In that patent, a special control system was used to minimize the time lag between charge and discharge cycles so that self-heating of the battery was maintained, and power consumption of separate battery heaters could be reduced.

The challenge of preventing battery cell damage by over-temperature condition is an issue for all batteries including sodium-sulfur. In standard sodium-sulfur batteries the operating temperatures can go as high as 390° C., however, because of the corrosive nature of the materials, the upper temperature range is controlled to a peak temperature of 350° C. to reduce excessive corrosive damage. In energy storage systems using standard sodium-sulfur batteries, an over-temperature condition requires the batteries to be disconnected and allowed to cool for several hours before the energy storage system can be reactivated. This is also true for Zebra batteries and all types of molten battery technologies.

Sodium-sulfur batteries have been proposed as especially suitable for energy storage in electric power applications, where variation in demand for energy can require generation and transmission capability to meet peak demands, while the average demand is much less. For example as in U.S. Pat. No. 6,522,103, in a sodium-sulfur battery system comprising a battery module having a sodium-sulfur battery contained in a thermal insulation container, an amount of peak-shift of an electric power line, which can be performed by the battery module, is calculated using a daily load characteristic of the electric power line and a discharge characteristic of the battery module, and an allowable amount of heat generation in battery and an allowable amount of discharge, and discharge of the battery module is controlled using the calculated result. The batteries were contained in thermal insulation containers to facilitate maintenance of the required high operating temperatures.

The need for effective storage can be even greater in connection with energy sources such as wind and solar, where the power output from the generator can also vary. A significant challenge to the use of sodium-sulfur batteries for such energy storage applications is the efficient provision and management of the heat required to maintain the battery's required operating temperature.

Geothermal heat sources, which produce geothermal fluids, are also used as energy sources to generate electricity. Here, geothermal fluids are used to drive a turbine to produce electricity. Geothermal power production is created as a function of heat removal from the geothermal fluids. Production wells feed high temperature geothermal fluids to the power plant and injection wells return the now cooler geothermal fluid from the plant back to the earth's reservoir. Power output can be more consistent but may still not effectively accommodate variations in demand. Therefore, there is still a need for effective energy storage.

Geothermal fluids include water or brines, oil, natural gas, $CO_2$ or any combination of co-produced fluids as products produced or stored from wells drilled into earth reservoirs. For the purposes of this application, geothermal fluids also include any secondary liquids or gases heated by geothermal fluids. Geothermal fluids also include fluids being returned to reservoirs found in the earth.

Sodium-sulfur cells are combined in to large batteries to create the voltage (V) and current (A) needed by the electrical system. Utilized-sized batteries are very large with hundreds of cells. The normal sodium-sulfur cell provides approximately 2.1V and approximately 10 A of current. Large utilized-sized battery use stacks of cells (connections in series) to create 400 to 500V output. To create enough current, normally 100 A or more, parallel stacks of cells are used. A battery using an array of cells is electrically illustrated in FIG. 2A. Utilized-sized batteries place the cells in close physical arrangement to reduce the wiring lengths and inside a protective insulated enclosure to maintain the elevated temperatures require by the sodium-sulfur cells.

All batteries have internal impedance to the charging and discharging currents. This impedance results in a loss of energy in the form of heat. All batteries self-heat when being charged and discharged. For example, charging a 1 kilowatt (kW) battery would result in a loss of approximately 5% or 50 W of self-heating. The same would be true for the discharge of a 1 kW battery. The act of storing and then utilizing 1 kW of energy from a battery results an energy loss of 100 W. For conventional sodium-sulfur battery storage systems, this waste heat is used to help maintain the batteries elevated temperatures. Significant research in using the waste heat in sodium-sulfur batteries has been exhausted toward this effort because of a serious complication with insulating the battery to capture waste heat.

The complication of using the waste heat generated during charging and discharging of the sodium-sulfur batteries comes from the serious problem of overheating. Overheating of the battery will result in loss of operating life time meaning the system will require early replacement or complete destruction of the sodium-cells. As such, sodium-sulfur battery energy storage systems must shut down and be allowed to cool if full capability of the energy storage system is being utilized. Cooling of these large systems takes hours. Battery-based energy storage systems are rated for total energy storage capability along with the maximum energy rate versus time duration before thermal shut down.

All battery-based energy storage systems, including sodium-sulfur batteries, require power electronic circuits to control charging, discharging and to interface the battery energy to the customer. In existing sodium-sulfur energy storage systems, the electronic control and interface circuits are housed in a separate enclosure, away from the hot batteries.

All electronic devices create waste heat as a function of internal resistance and current. This is especially true of power electronic devices which handle high voltages and currents. The operating life of normal power electronics is a function of leakage current and metallization of the silicon electronic devices. Leakage currents cause excessive heat in high voltage operations. Metallization is the metal conductor junction to the silicon chip. High current densities and elevated temperatures at the metal junction cause metal migration, or metal atoms moving into the silicon, weakening the conductivity of the circuit and increasing resistance which increases the generation of waste heat in the electronics. If the temperatures are not controlled, the device will surfer catastrophic damage.

The total waste heat generated in using battery-based energy storage is a function of waste heat generated in the batteries and the power electronics. In general, the charging and discharging efficiency of a battery-based energy storage system is referenced as the round-trip efficiency, including the heat loss of the cell during charging and discharging, current leakage, power electronic conversion losses to heat, and the heating of the battery in the cases where charge/discharge is not sufficiently frequent to maintain the battery temperature in the optimum range. The round-trip efficiency is normally 67 to 74%. For very large scale energy storage systems needed by the utility industry this is a significant cost to pay. For a 50 megawatt (MW) system, a round-trip energy return is only 33.5 MW to 37 MW. In other words, approximately 15 MW of waste heat can be generated.

High-temperature electronics components are electronic devices produced with SOI (Silicon-On-Insulator), SOS (Silicon-On-Sapphire), SiC (Silicon-Carbide), GaN (Gallium-Nitride) or other wide bandgap materials. SOI and SOS reduce the leakage current produced when silicon electronic devices are exposed to elevated temperatures by building the circuit transistors on a nonconductive base material as silicon-oxide, intrinsic silicon or sapphire among others. Leakage current is reduced by a factor of 100. Metallization of these devices uses large conductive pads built with high density metals to greatly reduce current density and loss of electrical connection through metal migration.

High-temperature electronics use advanced circuit interconnections based on ceramic substrates or ceramic circuit boards not found in conventional power electronic circuits. Ceramic circuit boards include SiC ceramic with a very high thermal conductivity. This invention is enabled, in part, by developments in high-temperature circuit board designs developed for geothermal well monitoring systems by the inventor and others.

High-temperature electronics developed for geothermal well monitoring encompass complete solutions for all electronic components and hardware as geothermal wells produce fluids at temperatures of 100 to 350° C. without any place for self generated waste heat from electronic devices to go other than into the hot fluid. As such, the electronics must operate at elevated temperatures at all times and dissipate waste heat in to the hot ambient environment of the geothermal well.

Although present devices are functional, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for the thermal management of a battery-based energy storage system. In one exemplary embodiment, the present invention can include a thermal management system for a battery-based energy storage system, the thermal management system comprising a residual heat source and a battery-based energy storage system thermally connected to the residual heat source. In this embodiment, the energy storage system may comprise a battery array and power electronics for charging and discharging the battery array. The residual heat source may be a geothermal heat source where geothermal heat includes, for example, heat as a byproduct of geothermal power plant power production or heat directly from geothermal wells. The thermal connection between the energy storage system and the residual heat source may be direct (e.g., the energy storage system may be adjacent to, partially located within, or fully located within the residual heat source) or indirect (e.g., using a heat conduit, such as a fluid piping system, to transfer heat). A heat conduit may comprise multiple separate piping systems, with separate fluids, which allow for heat transfer between the residual heat source and the energy storage system. In embodiments using a heat conduit to transfer heat, the thermal management system may further comprise a control system for controlling the circulation of a fluid in the heat conduit in order to regulate the temperature of the energy storage system. The control system may include control units, such as pumps and valves, current and power measurement, and temperature gauges which allow the control system to determine whether to circulate fluid to the energy storage system and/or the rate at which to circulate fluid to the energy storage system.

In another exemplary embodiment, the present invention can include a method for the thermal management of a battery-based energy storage system, the method comprising regulating the temperature of a fluid using a residual heat source and regulating an operating temperature of the energy storage system using a flow of the fluid for an exchange of heat between the energy storage system and the fluid. Regulating the temperature of a fluid using a residual heat source may comprise a direct heat transfer with a residual heat source (e.g., circulating the fluid through the residual heat source) or an indirect heat transfer with a residual heat source (e.g., circulating the fluid around a piping system to transfer heat to or from the piping system, wherein the piping system transfers a different fluid between the residual heat source and a geothermal power plant). In some embodiments, the method may further comprise using the fluid to generate electricity. The fluid may be used with a heat-to-electricity converter before or after the energy storage system. For example, in some embodiments, the fluid removes heat generated by the energy storage system when charging and discharging and then the fluid enters a geothermal power plant. The heat added to the fluid going into the power plant increases the output power production of a geothermal power plant.

In another exemplary embodiment, the present invention can include a method for the thermal management of a battery-based energy storage system comprising regulating the temperature of the energy storage system through an exchange of heat with a residual heat source. Regulating the temperature of the energy storage system may include maintaining an elevated temperature state needed for energy storage (e.g., keeping sodium in the energy storage system in a molten state).

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
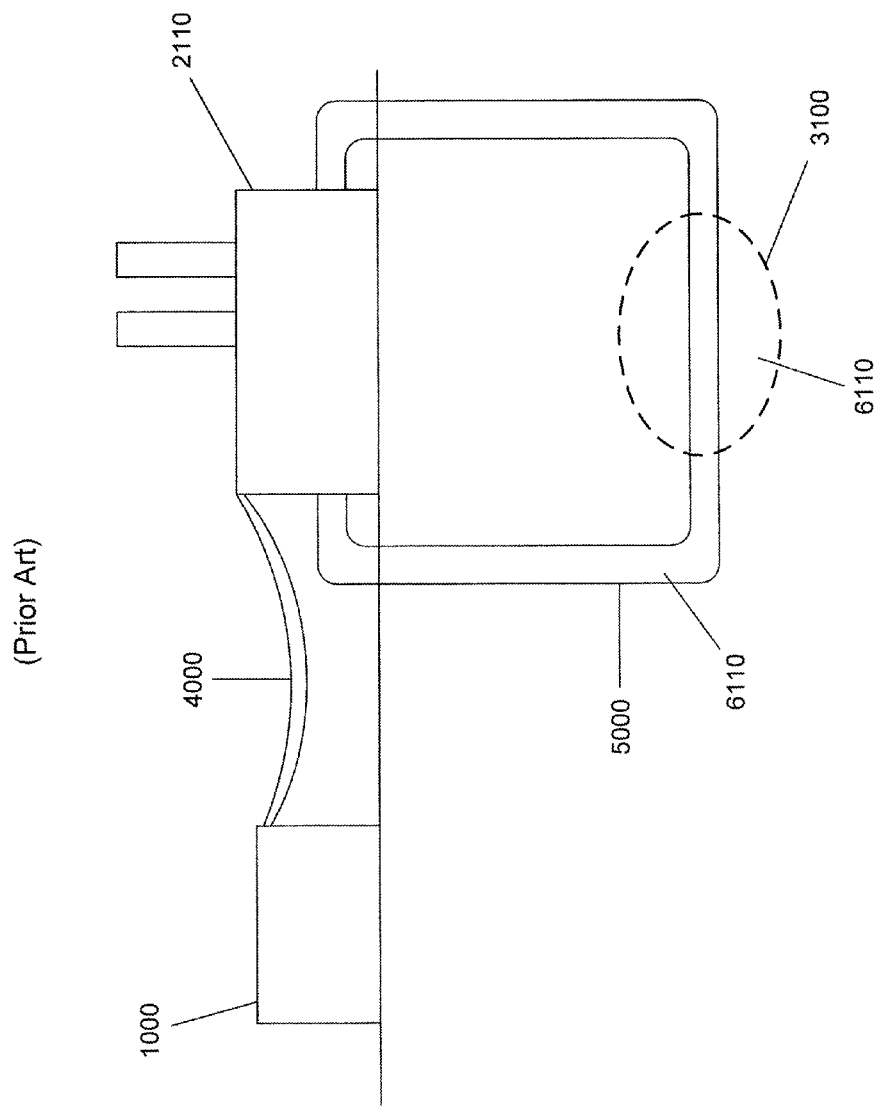
FIG. 1 shows a geothermal power plant which is powered by a geothermal fluid and backed up by a battery-based energy storage system.

The present invention describes systems and methods for managing the operating temperature of a battery-based energy storage system 1000. As shown in FIG. 1, battery arrays 1100 can be used as backup battery-based energy storage systems 1000 for large-scale electricity-generation plants. Such plants can include, without limitation, steam-powered electricity-generation plants, solar photovoltaic arrays, wind turbine arrays, and geothermal power plants. FIG. 1 depicts the use of a battery-based energy storage system 1000 with a geothermal power plant 2110.

Geothermal power plants 2110 generally operate continuously, and operate most efficiently under substantially constant load. In FIG. 1, the geothermal power plant 3100 is thermally connected to a geothermal heat source 3100 using a heat conduit 5000, such as a fluid piping system comprised of one or more fluid pipes or conduits, which can be configured to allow for continuous operation. This is not a good match with the usual power consumption requirements of an electricity-generation plant. Accordingly, it may be advantageous to connect, such as through power lines 4000, the geothermal power plant 2110 to a battery-based energy storage system 1000 in order to allow the geothermal power plant 2110 to operate continuously at substantially constant output, with the excess production in times of low demand stored in the battery-based energy storage system 1000 for later distribution during times of high demand.

Battery-based energy storage systems used as backups for geothermal power plants can accommodate very large battery arrays. Because a geothermal power plant requires large volumes of geothermal fluid, there is a large volume of geothermal fluid available for regulating the temperature of a large battery-based energy storage system 1000. Energy storage in the 100 Megawatt range or greater can be accommodated by such a battery-based energy storage system.

Other electricity generation sources can also benefit from the addition of a battery-based energy storage system. For example, wind and solar generators generally have fluctuating power output as local wind or sun conditions change. Battery-based energy storage systems can provide energy storage to allow such generators to be used in connection with power demand that is not amenable to such fluctuating output. In any such system, however, the battery-based storage system itself must be properly maintained and controlled.

Figure 2:
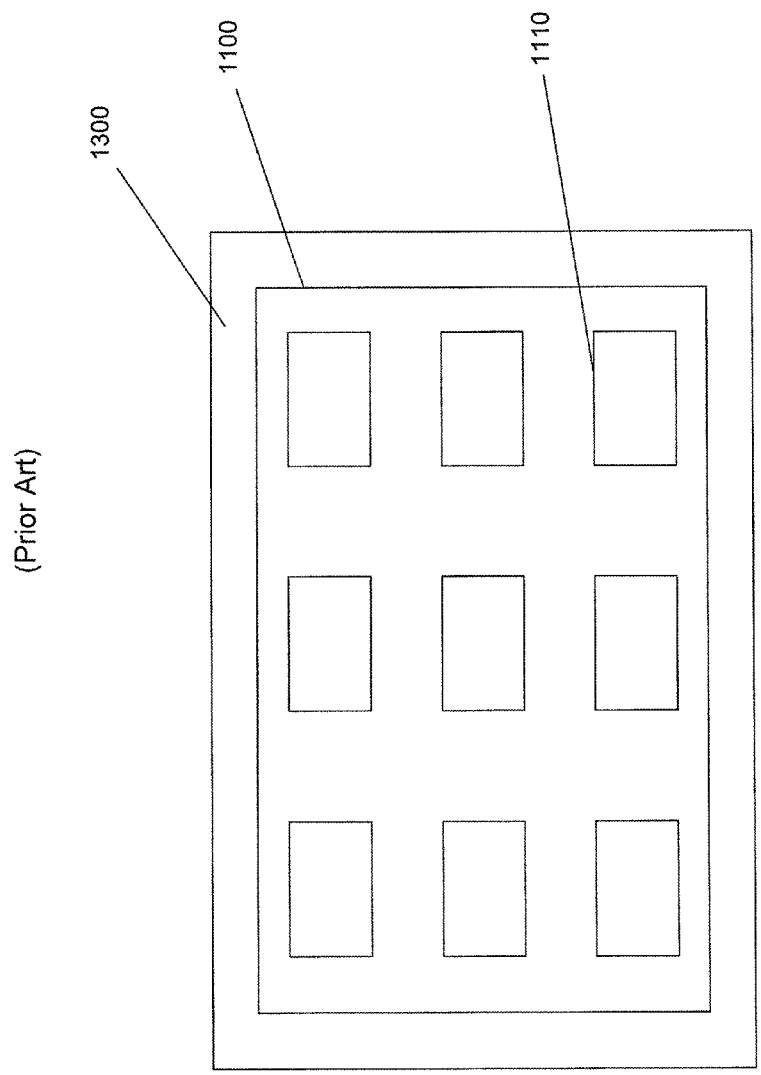
FIG. 2 shows a battery array as used in a battery-based energy storage system and having many battery cells and an insulation.
Figure 3:
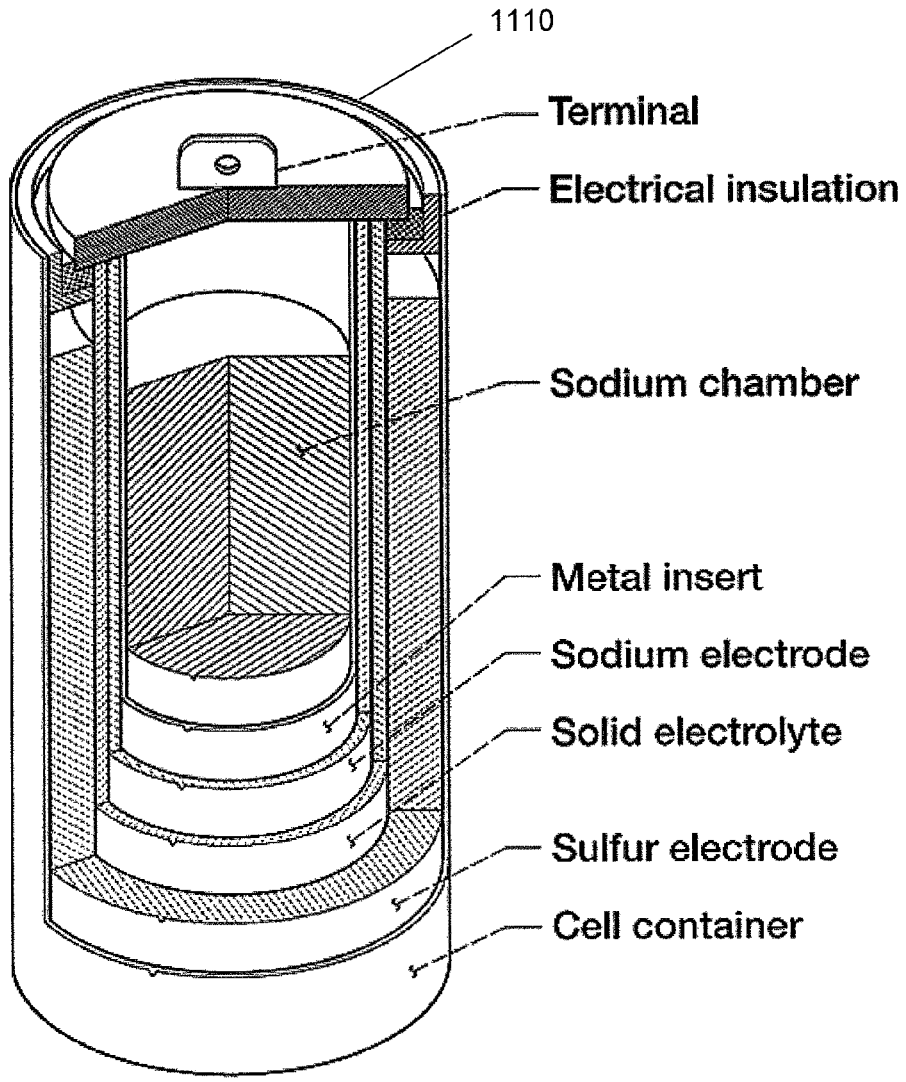
FIG. 3 shows a sodium-sulfur battery and its different components.

Referring now to FIG. 2, a battery-based energy storage system 1000 can include one (i.e., single cell) or more cells (i.e., battery array) of a molten salt type of battery. For example, a battery-based energy storage system 1000 can employ battery cells 1110 made of sodium-sulfur batteries as shown in FIG. 3. Other types of battery-based energy storage systems 1000 can include, without limitation, batteries using Zebra cell battery technology. Those of skill in the art will understand the large-scale energy storage and the different types of battery-based energy storage systems that can be used consistent with the present invention.

Figure 2A:
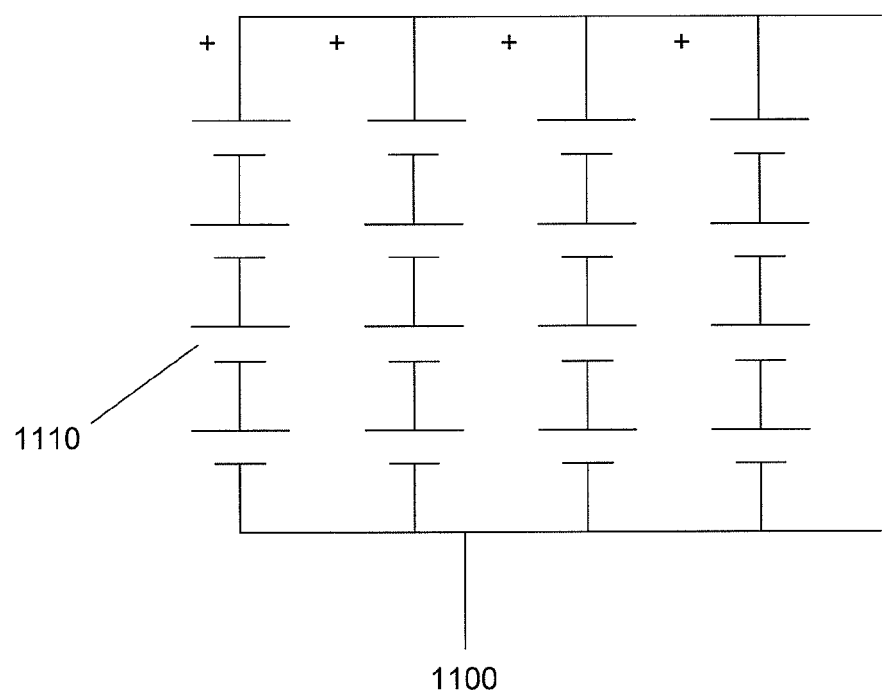
FIG. 2A shows a schematic of a battery array as in FIG. 2.

The battery array 1100 shown in FIG. 2 can include a plurality of battery cells 1110 encapsulated by insulation 1300. In other examples, partial insulation or no insulation may be used. However, in other embodiments, a battery array 1100 may consist of a single battery cell 1110. FIG. 2A shows a schematic of a similar battery array 1100.

In some exemplary embodiments, the insulation 1300 can help maintain a battery array's 1100 and individual battery cell's 1110 operating temperature by preventing the freezing of the electrolyte in a battery cell 1110. Additionally, the insulation 1300 can allow some cooling to help prevent the overheating of the electrolyte in a battery cell 1110.

However, battery cell 1110 and battery array 1100 operation may benefit from further temperature management. For instance, a longer operating time of a battery array 1100 may be sustained using more active cooling of the battery array 1100 where an insulator 1300 alone fails to allow enough heat to escape. In some embodiments even, an insulator 1300 may be absent as the temperature management of the battery array 1100 maintains an operating temperature within an operable temperature range or at an optimal temperature.

A battery-based energy storage system 1000 is typically charged by an energy source, such as a power grid, electricity-generation plant, wind mill, solar cells, or some other electricity-generation source, including the electricity-generation plant for which it serves as backup. For example, the battery-based energy storage system 1000 of FIG. 1 can be charged by the geothermal power plant 2110 when the load is below the plant's capacity and the battery-based energy storage system 1000 can provide an additional source of energy to the geothermal power plant 2110 when the load is above the plant's capacity.

Figure 4:
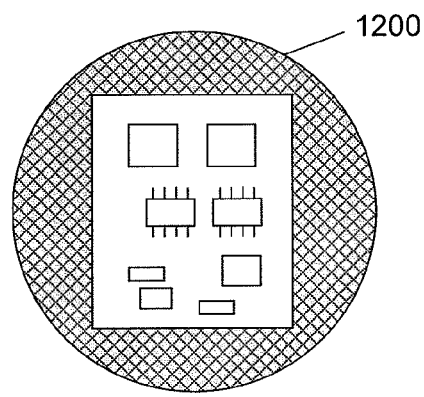
FIG. 4 shows an example of a power electronics used to charge and discharge a battery array in a battery-based energy storage system.

FIG. 4 depicts an example of power electronics 1200 that can be used as part of the battery-based energy storage system to transfer electricity to the electricity-generation plant or power grid, and vice versa. High-temperature power electronics and electronic circuits that are useful in applications involving battery-based energy storage systems as described herein can be produced with SOI (Silicon-On-Insulator), SOS (Silicon-On-Sapphire), SiC (Silicon-Carbide), GaN (Gallium-Nitride) or other wide bandgap materials.

Figure 5:
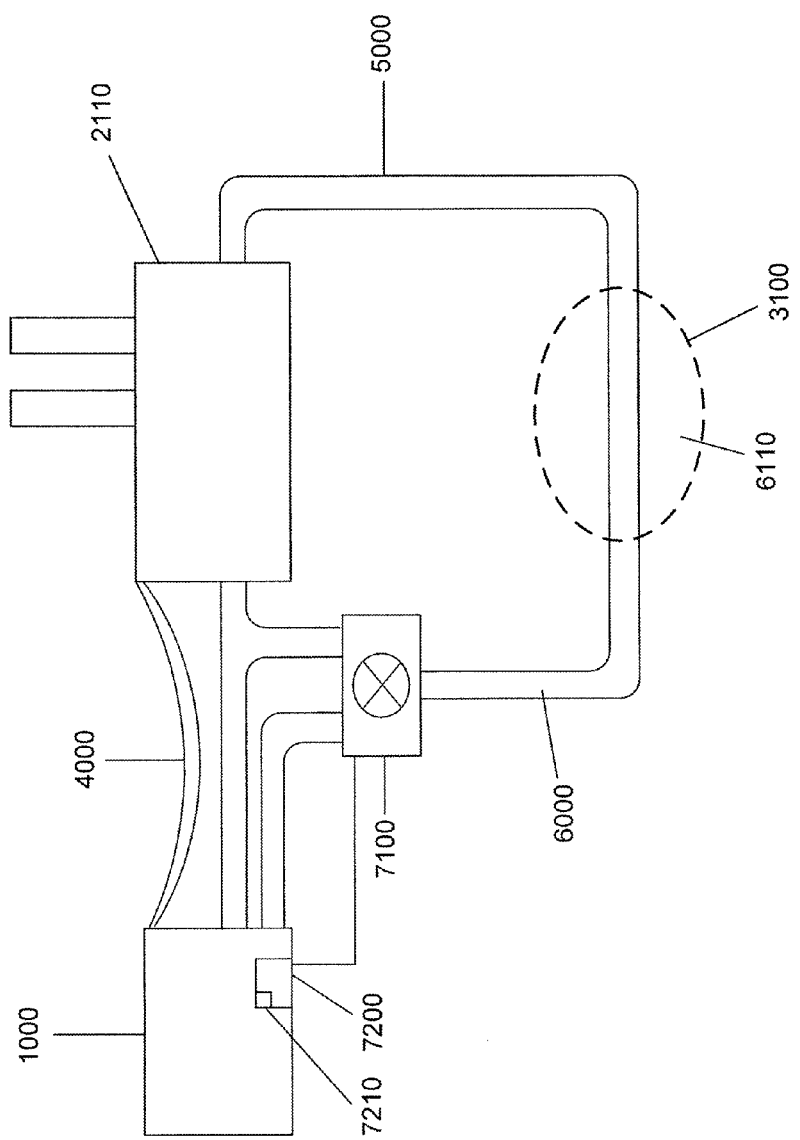
FIG. 5 shows a system using a control unit to regulate the temperature of the battery-based energy storage system using a heat exchange with a geothermal power source.

Referring now to FIG. 5, it shows an embodiment of the present invention which uses a battery-based energy storage system 1000 serving as a backup energy source to a geothermal power plant 2110. Power lines 4000 connect the battery-based energy storage system 1000 to the geothermal power plant 2110 for the transference of energy via the power electronics 1200 referred to in FIG. 4. Here, the geothermal heat source 3100 is also used to regulate the temperature of the battery-based energy storage system 1000. In the embodiment shown, a control unit 7100 regulates a flow of the fluid 6000 through a heat conduit 5000 to the battery-based energy storage system 1000. As can be seen, in this embodiment, the same fluid 6000 used to power the geothermal power plant 2110 is the same fluid 6000 used to regulate the battery-based energy storage system 1000 temperature. At the battery-based energy storage system 1000 a heat exchange occurs to either heat or cool the battery-based energy storage system 1000.

As the battery cells of a battery-based energy storage system 1000 charge or discharge, they self-heat. A control unit 7100 can include a temperature control system 7200 that senses (a) the temperature of the battery-based energy storage system 1000, (b) the current or power into or out of the battery-based energy storage system, or (c) both, and allows the heated fluid 6000 to flow and heat the battery-based energy storage system 1000 when the self-heating is insufficient to maintain the desired operating temperature. The temperature control system 7200 can employ a thermostat 7210 to detect changes in the battery-based energy storage system 1000 temperature.

It should be understood that electricity-generation plants other than geothermal power plants can be used in the present invention. For example, a wind farm may also use a battery-based energy storage system as backup. In this case, a geothermal heat source could be used to regulate the temperature of the battery-based energy storage system without being used to otherwise generate electricity. A control unit can regulate the flow of fluid to the battery-based energy storage system as in FIG. 5, except that the fluid is not a direct source of energy for the electricity-generation plant.

As noted above, wind farms or solar farms may benefit from battery backup systems in order to store energy during periods of high production and low demand so that the energy is available when demand exceeds power production (e.g., during nighttime for solar farms or periods of no wind for wind farms). However, not all wind farms or solar farms are near a residual heat source, such as a geothermal heat source. In such situations, a residual heat source cannot be used to help regulate the temperature of the battery-based energy storage system. Instead, in another embodiment of the present invention, a heat conduit, such as a fluid circulation system, can be used to cool the battery-based energy storage system when the operating temperature gets too high, and insulation may be used to prevent the temperature from getting too low. In addition, a heat-to-electricity converter may be added to the fluid circulation system in order to generate electricity using the heat removed from the battery-based energy storage system. For example, during period of charge and discharge a fluid can be recycled through the battery-based energy storage system and then through a Rankine cycle, such as an organic Rankine cycle, to remove heat from the battery-based energy storage system to prevent it from overheating and to generate electricity. A control system may be used to cease the fluid flow when the operating temperature of the battery-based energy storage system is reduced to a predetermined temperature. Based on the projected off time of the batteries, and the projected temperature loss, in some embodiments the predetermined temperature may be above the optimal temperature of the energy storage system so that the during the off period the temperature will slowly change from above the optimal temperature to below the optimal temperature before use of the energy storage system resumes. Depending on the effectiveness of the insulation around the energy-storage system, this predetermined temperature may be only slightly above the optimal temperature of the energy storage system.

Returning to FIG. 5, the fluid 6000 used to regulate the temperature of the battery-based energy storage system 1000 may be a geothermal fluid that is liquid or gas. Gas fluids from a geothermal heat source 3100 may include, without limitation, $CO_2$ or natural gas. Liquid fluids may include, without limitation, water, brines, oil, and combinations of different types of liquids. Those of skill in the art understand the various types of geothermal fluids used for geothermal power plants. All of those fluids can also be used to regulate the temperature of a battery-based energy storage system. Furthermore, a fluid can be native to a geothermal heat source or the particular residual heat source used or a fluid can be some other fluid, including, without limitation, silicon oil, water, oil, and molten sodium. In the latter case, the fluid could be heated by the geothermal heat source or by some other residual heat source. Those of skill in the art can understand that many types of other fluids, liquid or gas, can be used for the transfer of heat from a residual heat source.

Figure 6:
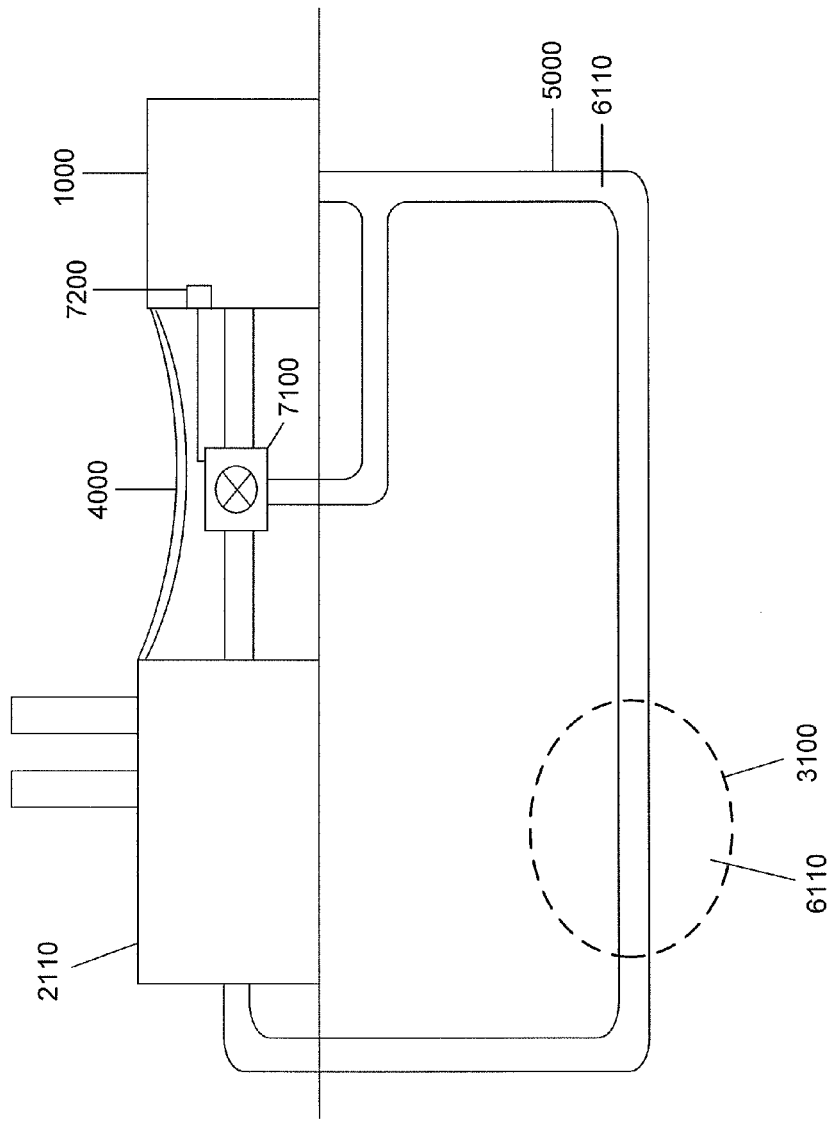
FIG. 6 shows a system similar to that in FIG. 5 but using a control unit to regulate the temperature of the battery-based energy storage system after the fluid has been used as a power source for the geothermal power plant.

FIG. 6 shows another embodiment in which the heat exchange between the fluid, here a geothermal fluid 6110, and the battery-based energy storage system 1000 occurs after the geothermal fluid 6110 is used to power the geothermal power plant 2110. Here the control unit 7100 can regulate the flow of geothermal fluid 6110 to determine the extent to which it returns to the geothermal heat source 3100 or is used to regulate the temperature of the battery-based energy storage system 1000. In other embodiments there may be a heat exchange between the fluid and the battery-based energy storage system before the geothermal power plant uses the fluid heat for electricity generation and another heat exchange between the fluid and the battery-based energy storage system after the geothermal power plant uses the fluid heat for electricity generation. In other words, the fluid can take more than one path to the heat exchange with the battery-based energy storage system.

A control unit is useful where the residual heat source temperature is either below or above the operable temperature range of the battery-based energy storage system. For example, where the residual heat source temperature is above the operable temperature range of the battery-based energy storage system, it would not be beneficial to continuously circulate the fluid at the battery-based energy storage system. The result could be that the battery-based energy storage system temperature rises above its operable temperature range while the battery-based energy storage system is discharging and the battery-based energy storage system could be damaged from overheating. On the other hand, if a control unit were used to create a fluid flow only when the battery-based energy storage system temperature was at the low end of the battery-based energy storage system's operable temperature range, the fluid can be used to prevent the battery-based energy storage system from freezing.

Conversely, if the residual heat source temperature were below the operable temperature range of the battery-based energy storage system, the control unit may allow the fluid to flow through a heat exchange with the battery-based energy storage system when the battery-based energy storage system's temperature were in danger of rising above the operable temperature range. Thus, the fluid could be used to prevent the battery-based energy storage system from being damaged from overheating. Those of skill in the art can understand that configuring a control unit to control a fluid flow can depend on many factors including, without limitation, the operable temperature range of the battery-based energy storage system, the temperature of the residual heat source, the temperature of the fluid at the heat exchange with the battery-based energy storage system.

Additionally, the battery-based energy storage system can have an optimal operating temperature. Keeping the battery-based energy storage system temperature as near as possible to the optimal operating temperature may allow the battery-based energy storage system to charge and discharge as efficiently as it can for example. In some instances, the residual heat source temperature and the fluid temperature can be substantially near the optimal operating temperature. An embodiment in this case can involve a control unit which permits the fluid to constantly flow, thus keeping the temperature of the battery-based energy storage system substantially near the optimal operating temperature. Here, the fluid receives the excess heat of the battery-based energy storage system to prevent the battery-based energy storage system 1000 temperature from rising substantially above the optimal operating temperature. Other embodiments may lack a control unit if the fluid can flow naturally through the conduit to effect an exchange of heat to prevent the battery-based energy storage system temperature from rising substantially above the optimal operating temperature. Yet other embodiments may include a control unit but not a thermostat as there may be no need to detect the temperature of the battery-based energy storage system.

In other embodiments, the control unit may regulate the flow of fluid to maintain the battery-based energy storage system temperature substantially near the optimal operating temperature where the residual heat source temperature and the fluid temperature differ significantly from the optimal operating temperature.

Figure 7:
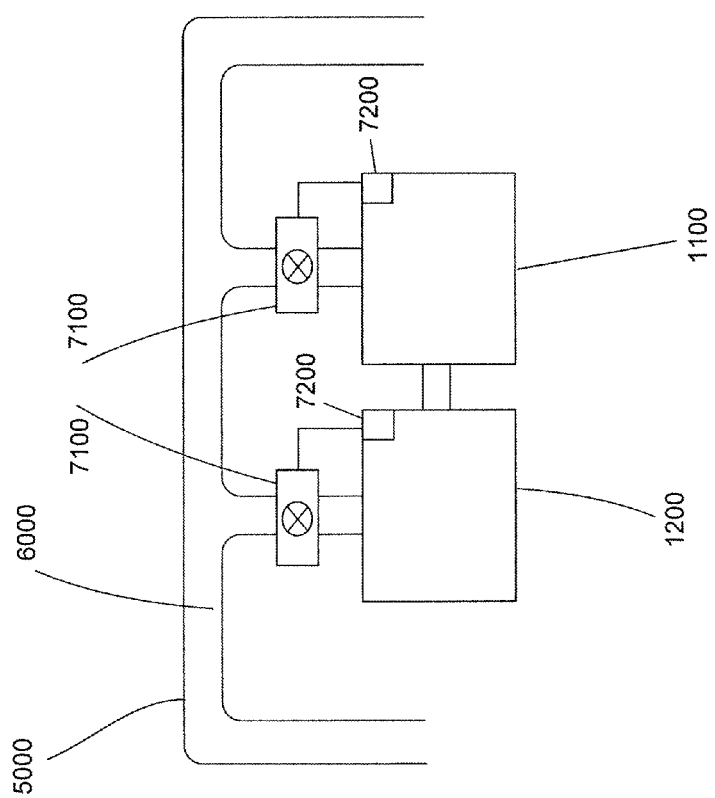
FIG. 7 shows a more detailed example of the use of two control units to control the flow of a fluid for the thermal management of the battery array and power electronics independently.

Referring now to FIG. 7, in other embodiments of the present invention using a control unit 7100, more than one control unit 7100 can be used as part of a single control system 7000. A first control unit 7100 controls fluid flow at a battery array 1100 of the battery-based energy storage system 1000 to maintain the temperature of the battery array 1100. A second control unit 7100 controls fluid flow at a power electronics 1200 of the battery-based energy storage system 1000. The terms first and second are used for references purposes and other embodiments may use more than two control units. Each control unit 7100 can control the fluid 6000 flow depending on the temperature regulation needs of the battery array 1100 and the power electronics 1200 of the battery-based energy storage system 1000. A control system 7000 can be made up of two or more control units 7100, each of which control the fluid 6000 flow at different locations. The control system 7000 can provide coordinated flow control among the control units 7100 for a coordinated exchange of heat between the fluid 6000 and the battery array 1100, power electronics 1200, and electricity-generation plant.

Other embodiments can use a control unit to control the flow of the fluid to both a power electronics and a battery array. Such a configuration can be useful where excess from the power electronics is used to assist in regulating the temperature of the battery array. For example, where the residual heat source temperature is below the operable temperature range of the battery array, the power electronics' residual heat is used to further heat the fluid. In other words, the power electronics operates as a residual heat source for the thermal management of the battery array. The heated fluid then has a temperature appropriate for keeping the operating temperature of the battery array within its operable temperature range. Each control unit can be used to regulate the flow of the fluid when an exchange of heat is desirable for the power electronics and battery array independently.

For example, it may be desirable to exchange heat between the fluid and the power electronics to prevent the power electronics from overheating. However, the battery array temperature may be within its operable temperature range. Here, the control unit may allow a fluid flow to exchange heat with the power electronics, but the other control unit may restrict or prevent fluid flow which would allow an exchange of heat with the battery array. Whether to allow, restrict, or prevent a fluid flow to exchange heat with a power electronics and battery array can depend on may factors including, without limitation, fluid temperature, residual heat source temperature, operable temperature range of the battery array, and operable temperature range of the power electronics. In embodiments using a control system, the control units can be located in the same housing or as separate physical units.

A control unit or control system can also be used to control the rate of fluid flow so that the heat exchange with a battery array and a power electronics further regulates the temperature of the fluid. This regulation of the fluid temperature could be useful in heating the fluid more and thus, providing more energy to a geothermal power plant. It can be understood by those of skill in the art that altering the fluid flow characteristics including, without limitation, the direction, the rate, and the number of flows, such as redirecting part of the flow to increase or decrease a heat exchange, can be used to regulate the temperatures of the fluid and the battery-based energy storage system.

Figure 8:
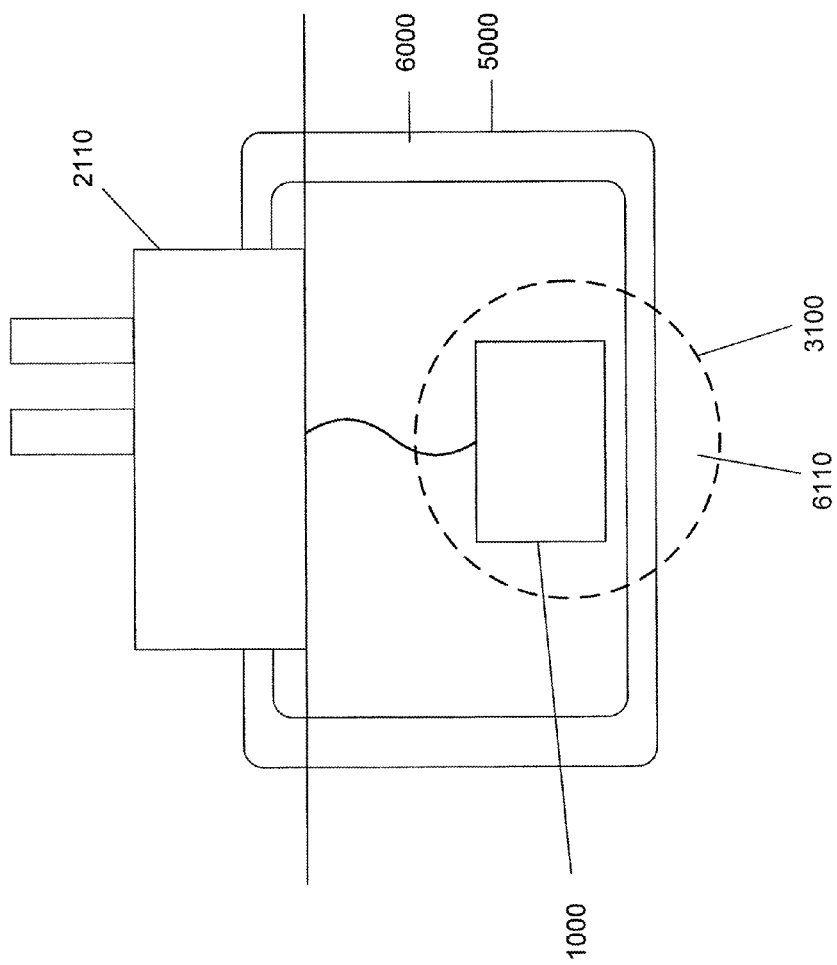
FIG. 8 shows a system similar to that in FIG. 5 but regulating the temperature of the battery-based energy storage system by disposing it in the geothermal heat source.

Referring now to FIG. 8, in one embodiment the battery-based energy storage system 1000 may be placed within a geothermal heat source 3100 and be engulfed in geothermal fluid 6110 from the geothermal heat source 3100. Again, the geothermal fluid 6110 may be liquid or gas. In this particular embodiment, the ambient temperature of the geothermal heat source 3100 is such that placement of the battery-based energy storage system 1000 within that environment allows the battery-based energy storage system 1000 to maintain a temperature within its operable temperature range. The fluid 6000 used to power the geothermal power plant 2110 can be the same geothermal fluid 6110 used to regulate the temperature of the battery-based energy storage system 1000 or can be some other fluid, as described above. Further, the embodiment as shown in FIG. 8 may involve a geothermal heat source 3100 which has a temperature equal to an optimal operating temperature of the battery-based energy storage system 1000. Other embodiments similar to that in FIG. 8 may include an insulator to assist in maintaining an operable temperature of the battery-based energy storage system. For example, if the temperature of the geothermal heat source is below the operable temperature range of the battery-based energy storage system but is still higher than a typical ambient temperature surrounding a battery-based energy storage system, the geothermal heat source may be used to prevent the battery-based energy storage system from cooling too fast. Thus, the battery-based energy storage system need not be actively heated to maintain an operable temperature. Likewise, the cooler temperature of the geothermal heat source can be used to prevent the battery-based energy storage system from overheating.

FIG. 8 also illustrates an embodiment involving an optimal operating temperature of the battery-based energy storage system 1000 and a residual heat source, here a geothermal heat source 3100, having a temperature substantially near the optimal operating temperature, The battery-based energy storage system 1000 can be engulfed in the geothermal fluid 6110 to keep the battery-based energy storage system 1000 temperature substantially near the optimal operating temperature at all times.

In other embodiments, a battery-based energy storage system can be placed partially within a residual heat source. In other words, just a portion of a battery-based energy storage system can be engulfed in a fluid. Those of skill in the art can understand that where an embodiment involves placing a battery-based energy storage system at least partially within a residual heat source that the extent to which the battery-based energy storage system is engulfed can depend on many factors. Such factors include, without limitation, the operable temperature range of the battery-based energy storage system and the temperature of the residual heat source.

Partially disposing a battery-based energy storage system in a residual heat source can also be used where the residual heat source temperature is not substantially near the optimal operating temperature. The present invention can still be used to maintain the battery-based energy storage system temperature substantially near the optimal operating temperature. For example, the residual heat source temperature may be significantly higher than the optimal operating temperature. Here, the battery-based energy storage system can be placed partially in the residual heat source to an extent where enough heat can be transferred between the residual heat source and the battery-based energy storage system to maintain the battery-based energy storage system temperature substantially near the optimal operating temperature.

When placed at least partially in a geothermal heat source or other residual heat source, battery arrays that make up a battery-based energy storage system or even the entire battery-based energy storage system can be placed in tubing or other watertight or pressure housings to keep out external fluids. The battery-based energy storage system can be lowered to a region of a well where the surrounding temperature is suitable for maintenance of a desirable desired operating temperature of the battery-based energy storage system. The internal fluids of a battery array of a battery-based energy storage system can also aid in thermal conductivity and in pressure equalization.

Sodium-sulfur batteries placed inside a residual heat source can benefit from constant temperature and also from the vertical orientation. Vertical sodium-sulfur batteries are generally easier and less expensive to build. The electrical connection of the batteries can be placed on top and built using common conductors, as stainless steel, instead of the more noble metals as gold or titanium generally needed for sodium-sulfur batteries operated in non-vertical orientations. A battery-based energy storage system placed inside a well can also benefit from the use of high-temperature power electronics needed to monitor charge and discharge of the battery array. Battery arrays placed inside a well can also be built to lengths much greater than current battery arrays. For example, battery cells or battery arrays with lengths of 90 ft. or longer can be achieved using the well as support.

Furthermore, a residual heat source may be any source of heat which emits heat as a byproduct of some man-made or natural process. Embodiments of the present invention can use the residual heat from such processes where the residual heat would otherwise be unused or is primarily harvested for some other purpose, like electricity generation. For example, a steam-producing electricity-generation plant can emit heat that is not captured in the steam product of the plant. Instead, that heat, residual to the steam production, can be used as a residual heat source. Also, as mentioned above, power electronics can be used as a residual heat source.

As already mentioned, a residual heat source 3000 may include a geothermal heat source. A geothermal heat source can include, without limitation, a naturally occurring emission of heat from the earth's surface, such as an underground source as used in geothermal power plants; a man-made well emitting heat from the earth, such as an oil or gas well; and fluids produced as a by-product of wells. Again, gas fluids from a geothermal heat source may include, without limitation, $CO_2$ or natural gas. Liquid fluids may include, without limitation, water, brines, oil, and combinations of different types of liquids. Some embodiments can remove fluid from the residual heat source and return fluid to the residual heat source. The present invention is described in the context of sodium-sulfur batteries, but can be applicable to other battery or storage technologies with similar temperature requirements. It should be understood that the present invention is not limited to any particular residual heat source and that any source of heat where the heat is otherwise unused or is primarily harvested for some other purpose can serve as a residual heat source.

Figure 9:
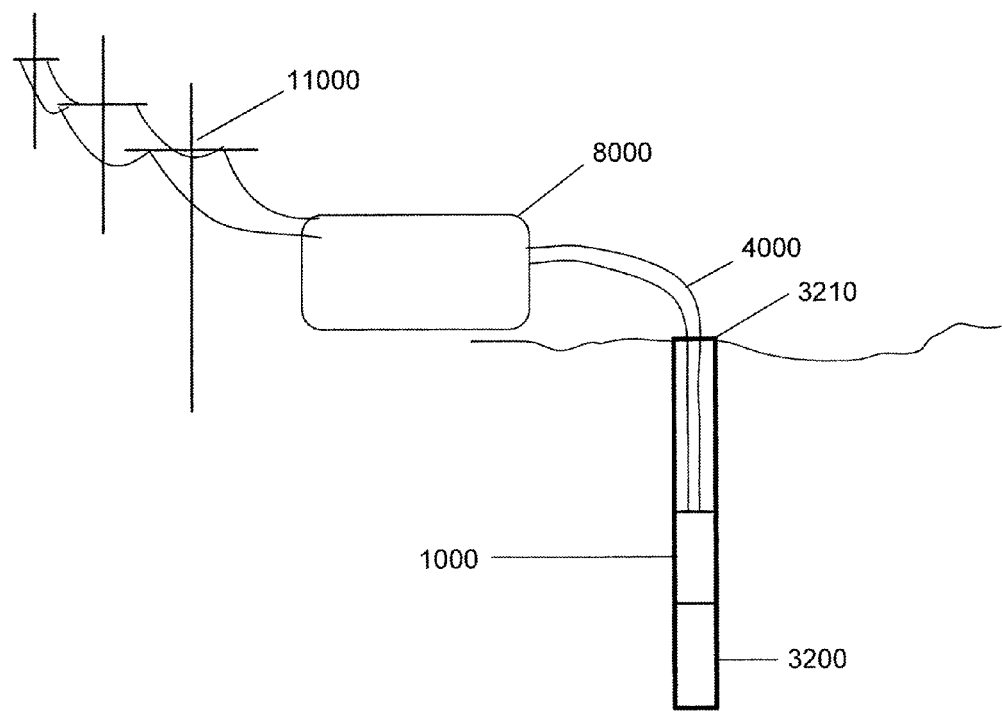
FIG. 9 shows a battery-based energy storage system disposed in a man-made well for the regulation of its temperature and where the battery-based energy storage system is used as a backup to a power grid.

Referring now to FIG. 9, it shows a battery-based energy storage system 1000 disposed in a man-made well 3200 and connected via power lines 4000 to a power grid 11000 through an inverter/converter 8000. Here, the battery-based energy storage system 1000 can provide energy backup capability, for example for critical facilities. Such backup capability is sometimes provided with generators. Generators, however, must be regularly maintained, periodically operated to assure readiness, and can take seconds to restore power after failure of the main power source. However, battery-based energy storage systems 1000 as used in the present invention can provide a more ready backup energy source and require less maintenance. For example, sodium-sulfur batteries alone in such applications will have infrequent charge/discharge cycles, and so self-heating is not practical.

But according to embodiments of the present invention, a suitable battery array can be disposed in a man-made well at a location with an appropriate temperature. The battery array can be charged from the power grid, and can provide backup power within milliseconds in the event of failure of the main power source of the power grid. Such a backup system can provide a maintenance free backup power supply, with estimated lifetime of 50 years or more, with no fossil fuels or moving parts, and fast switching to backup power. Also, returning to FIG. 9, the above ground surface area required for the well hole 3210 to store the battery array 1100 is very small, especially when compared with the area required for conventional backup generators. Battery arrays disposed in a well can be much less susceptible to damage from natural forces. For example, a tornado can destroy a generator, but has little effect on a battery-based energy storage system disposed deep underground. A battery-based energy storage system here would also be less susceptible to man-made forces like sabotage, poor maintenance, or attack. For example, a battery-based energy storage system could be disposed underground is would have little risk of collision. As an added benefit, battery-based energy storage systems that are currently separated from populated areas because of the inherent dangers accompanying the chemicals used could be disposed underground in populated areas, safe from the dangers of above-ground installation. For example, heavily populated areas that sit over geothermal heat sources can now accommodate these battery-based energy storage systems to provide backup to the power grid when disposed underground.

Figure 10:
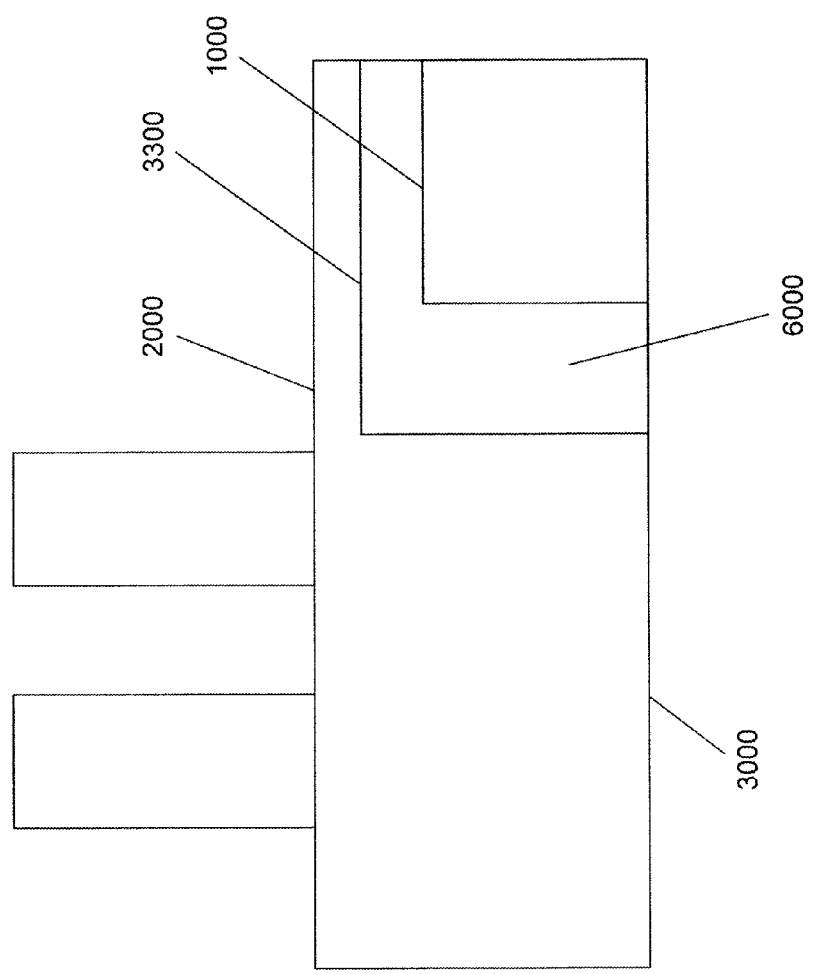
FIG. 10 shows a system wherein a battery-based energy storage system is located in an area of an electricity-generation plant where residual heat from the plant is used to regulate the temperature of the battery-based energy storage system.

Referring now to FIG. 10, it shows an embodiment where the residual heat source 3000 is an electricity-generation plant 2000. However, the battery-based energy storage system 1000 is again disposed, at least partially, within a fluid 6000 heated by the residual heat source 3000. Similar to the embodiment shown in FIG. 8 except the residual heat is heat emitted from the electricity-generation plant 2000 rather than a geothermal heat source. Here, the ambient temperature is regulated by the residual heat from an electricity-generation plant 2000. Such an area 3300 can be located within or near an electricity-generation plant 2000.

Figure 11:
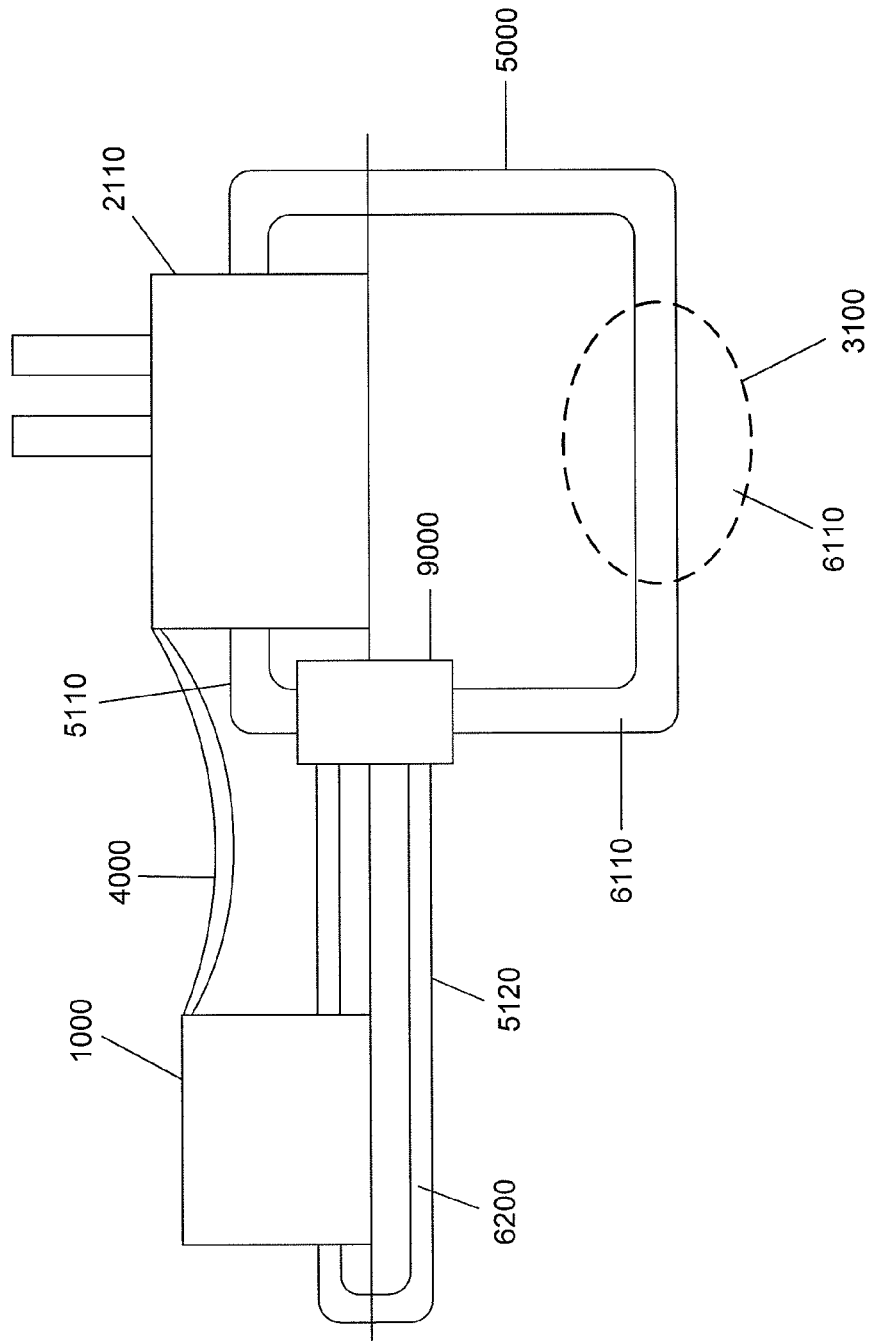
FIG. 11 shows a system similar to that of FIG. 5 but using a secondary fluid conduit carrying a second fluid wherein the temperature of the second fluid is regulated by the fluid in the primary fluid conduit through a heat exchanger and the temperature of the battery-based energy storage system is regulated by the fluid in the secondary fluid conduit.

The present invention is not limited to using the same fluid for (a) geothermal power production and (b) regulating the temperature of the battery-based energy storage system. For example, FIG. 11 shows a heat conduit 5000 comprising a primary fluid conduit 5200 carrying geothermal fluid 6110 which is used to power a geothermal power plant 2110 and a secondary fluid conduit 5300 carrying a secondary fluid 6200 to regulate the temperature of the battery-based energy storage system 1000. Here, the secondary fluid 6200 temperature is regulated by a heat exchanger section 9000 between the secondary fluid conduit 5300 and the primary fluid conduit 5200. The embodiment shown in FIG. 11 is advantageous because geothermal power plants benefit from a constant flow of geothermal fluid. Here a control unit 7100 does not disrupt the flow of the geothermal fluid 6110. FIGS. 12-15, as discussed further below, provide additional description of embodiments of a heat exchanger 9000 between conduits, or separate fluids, that may be used consistent with the present invention.

Figure 12:
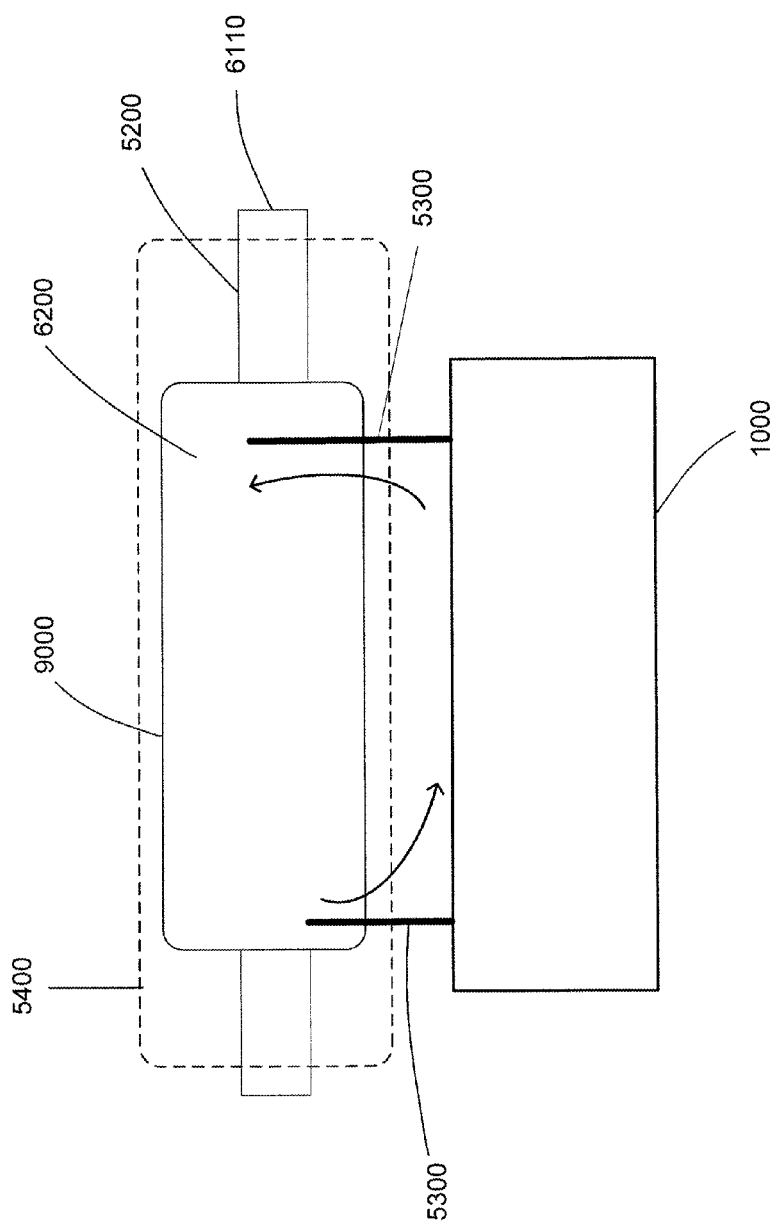
FIG. 12 shows an example of a generalized heat exchanger as referenced in FIG. 11.

Referring now to FIG. 12 it shows a heat exchanger 9000 consistent with an embodiment of the present invention. The heat exchanger 9000 includes a primary fluid conduit 5200 (i.e., the pipe used to transport heat between the geothermal heat source and the geothermal power plant) and a secondary fluid conduit 5300 (i.e., the pipe used to transport fluid to the battery-based energy storage system). The terms first and second are used for reference purposes only. Embodiments of the present invention may transport a secondary fluid 6200 through a secondary fluid conduit 5300 as shown in FIG. 11. In some embodiments, the secondary fluid conduit 5300 may be fully or partially enclosed in an insulator 5400 to help regulate the secondary fluid's 6200 temperature.

In addition, the heat conduit 5000 can operate to transfer heat from a native fluid, here a geothermal fluid 6110, from a residual heat source, here a geothermal heat source 3000. A native fluid can be any fluid that is the original medium containing the heat energy from the residual heat source.

Figure 13:
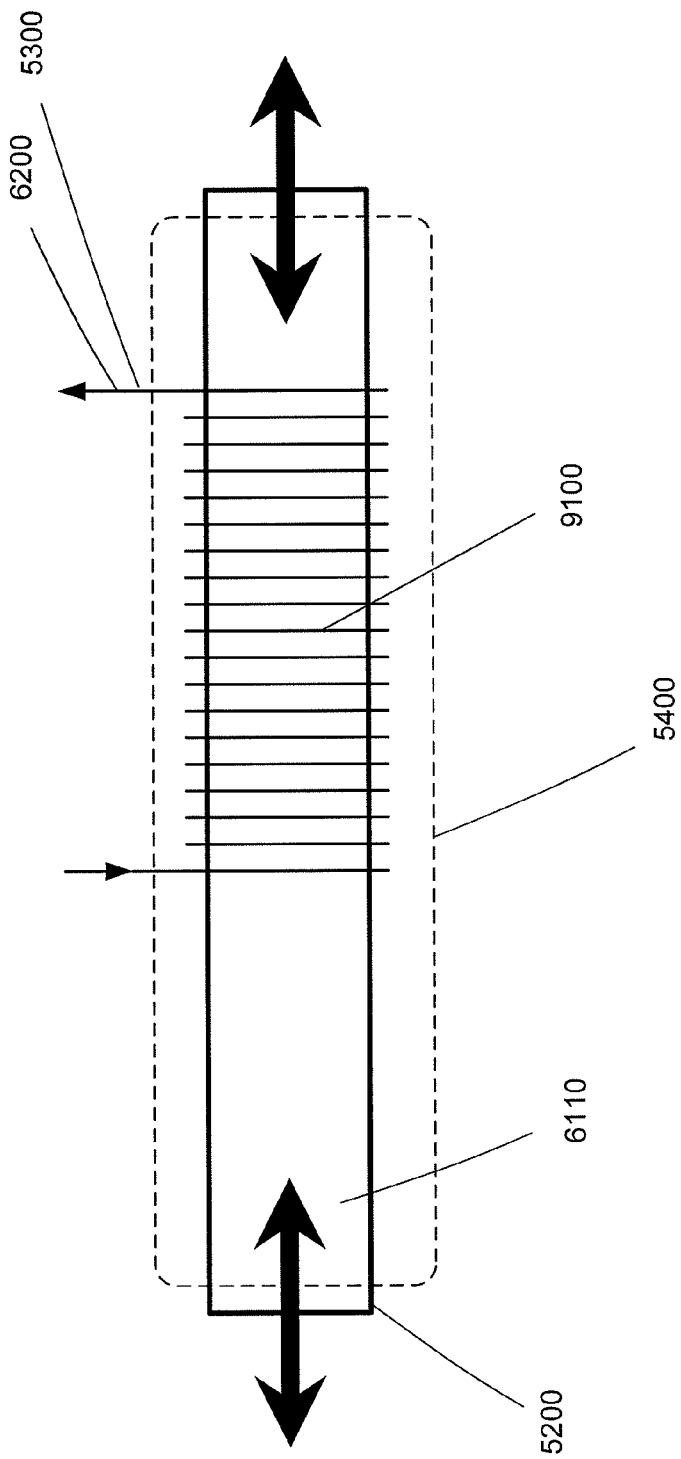
FIG. 13 shows an example of a heat exchanger as referenced in FIG. 12 using a coiled secondary fluid conduit to operate as the heat exchanger.

In the embodiment shown in FIG. 11, the transfer of heat is accomplished by coiling the secondary fluid conduit 5300 around a primary fluid conduit 5200 inside the conduit insulator 5400. FIG. 13 shows an example of this type of heat exchanger 9000 accomplished by coiling. The particular coiling 9100, for example, the number of turns around or the circumference of the coiled conduit, that is used to transfer heat can depend on many factors including, without limitation, the temperature of the residual heat source, the type of fluid and flow rate of the fluid in the coiled conduit, the type of and flow rate of the fluid in the conduit, the heat transference properties of the conduit, and the operable temperature range of the battery-based energy storage system.

In other embodiments, the secondary fluid conduit may be self-insulating such that an additional insulator is not required or the insulator can be integrated into the conduit. Other embodiments may lack a conduit insulator entirely. The use of a conduit insulator may depend on many factors, including, without limitation, the operating temperature range of the battery-based energy storage system, the conduit material, the temperature of the residual heat source, and the temperature of other fluids used to transfer heat. In some embodiments, rather than a fluid native the residual heat source, another fluid can be used to transfer heat to the secondary fluid. Those of skill in the art can understand that multiple heat transfers between multiple fluids can take place to transfer heat from a heat source to thermally manage a battery-based energy storage system.

In some embodiments of the present invention, a heat exchanger may be combined with a control unit. In such an embodiment, the control unit can control the flow rate of the secondary fluid in order to better regulate the operating temperature of the battery-based energy storage system.

Figure 14:
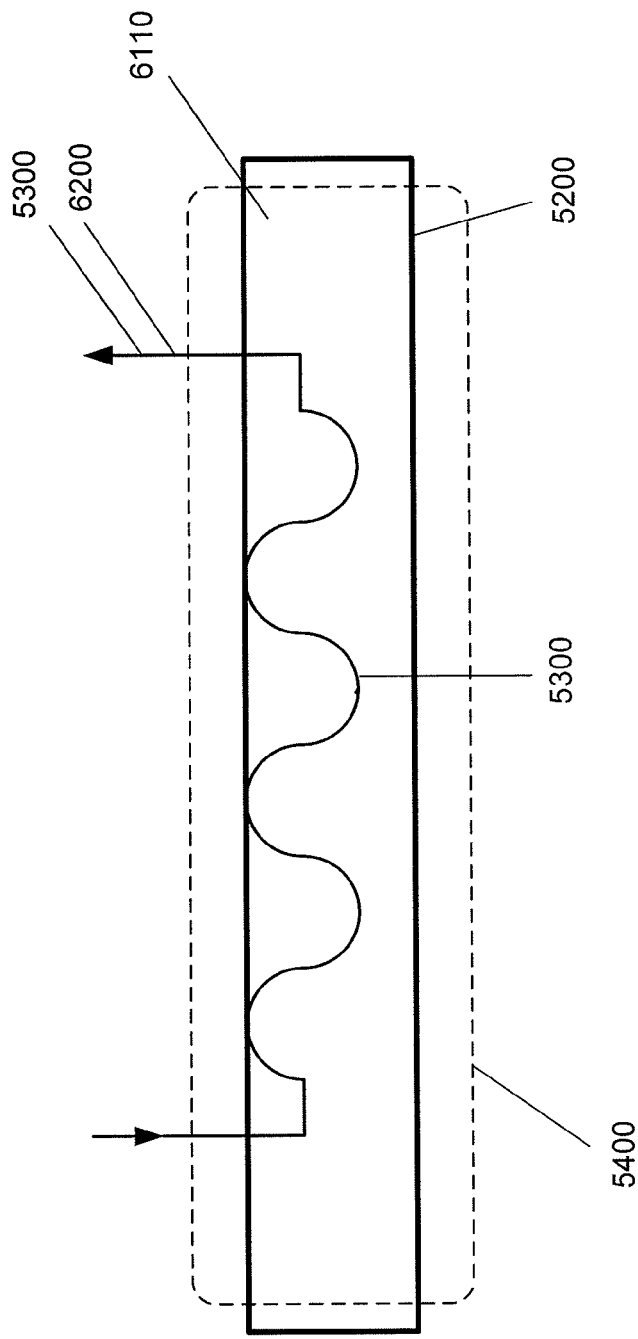
FIG. 14 shows an example of a heat exchanger as referenced in FIG. 12 using a serpentine coiled secondary fluid conduit to operate as the heat exchanger.
Figure 15:
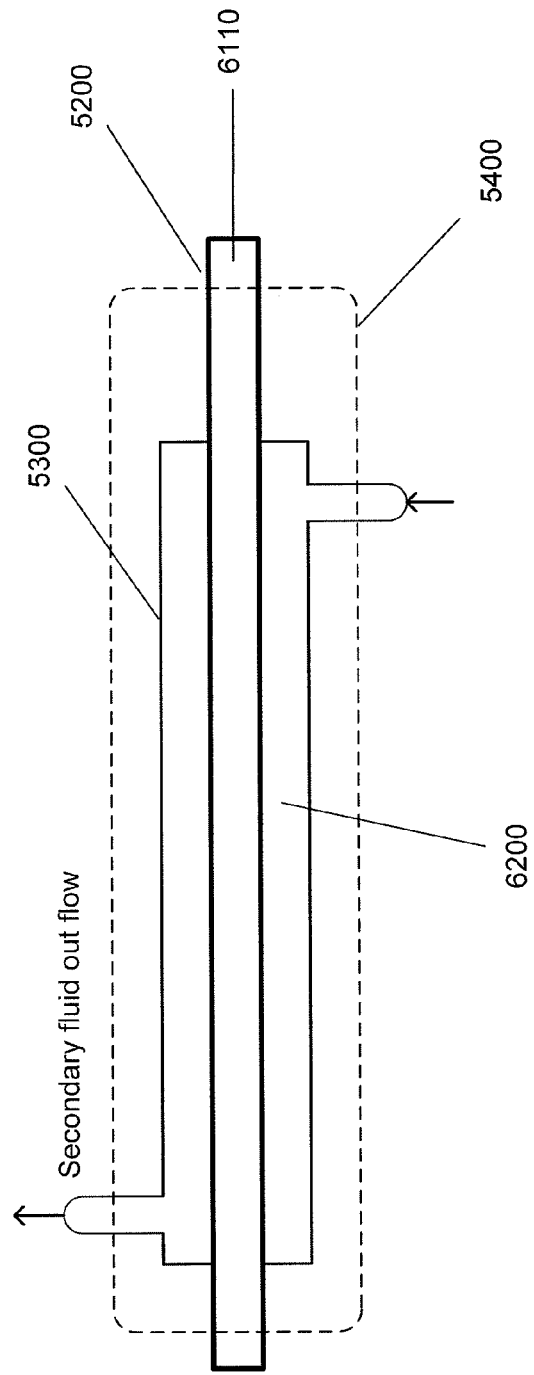
FIG. 15 shows an example of a heat exchanger as referenced in FIG. 12 using a double-pipe-type heat exchanger where the secondary fluid conduit at least partially surrounds the primary fluid conduit.

FIGS. 14 and 15 show other examples of a heat exchanger 9000, a serpentine coil 9200 and a double-pipe heat exchanger 9000, respectively. The particular technique used to transfer heat between fluids, again, can depend on many factors as described above. Those of skill in the art can understand the numerous ways to transfer heat between multiple conduits carrying fluids involving temperature differentials. Again, the configuration of a particular type of heat exchanger, for example, the number of turns in a serpentine coil or the length of a double-pipe heat exchanger, can depend on many factors as discussed above.

Figure 16:
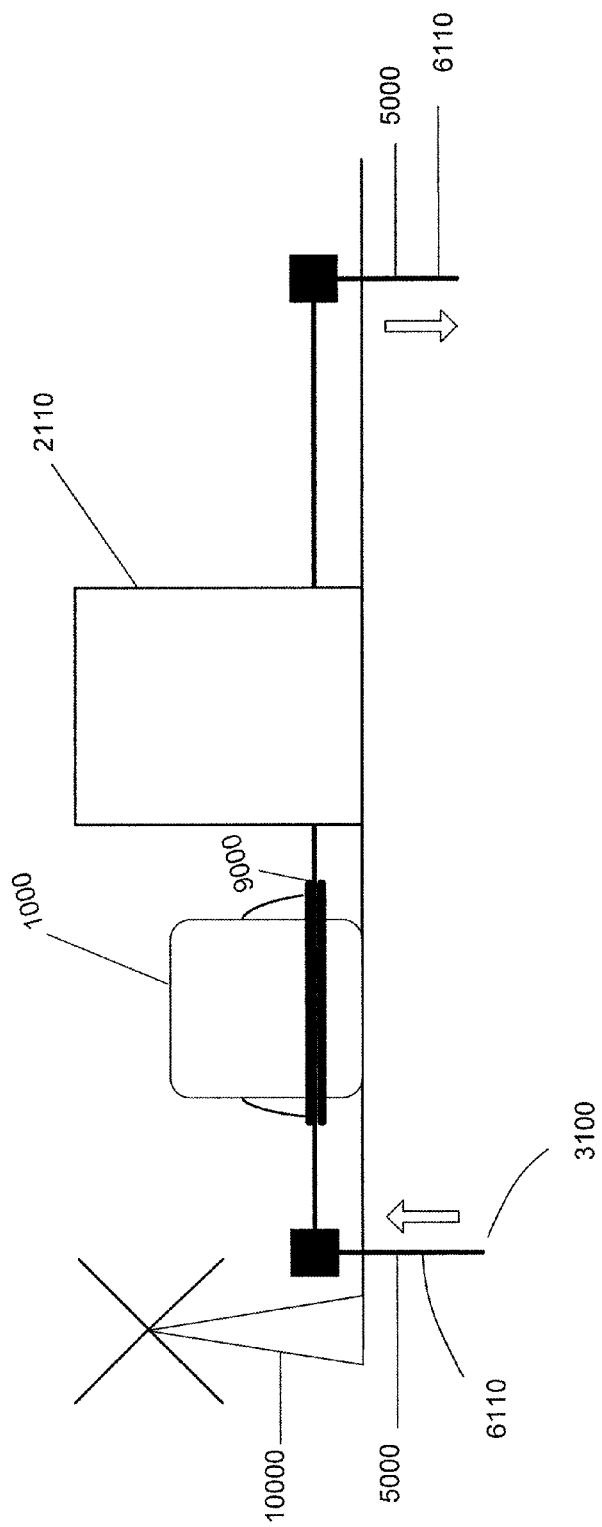
FIG. 16 shows a system similar to that in FIG. 5 but adding a supplementary heat source in addition to the geothermal heat source to regulate the temperature of the fluid.

Now turning to FIG. 16, it shows an embodiment of the present invention wherein the geothermal fluid 6110 passes through a heat exchanger 9000 coupled to the battery-based energy storage system 1000 to regulate the battery-based energy storage system temperature and passes through a geothermal power plant 2110 for the generation of electricity. In some instances, the temperature of the geothermal fluid 6110 is too low for heating the battery-based energy storage system 1000. The present invention contemplates that supplementary heat sources can be used in conjunction with a residual heat source. In FIG. 16, the supplementary heat source 10000 is a wind turbine. Other supplementary heat sources include without limitation, solar photovoltaic cells, hydroelectric generators, and other energy sources. In this particular example, the wind turbine supplementary heat source 10000 is used to generate heat to add to the geothermal fluid 6110 where the geothermal heat source 3100 is unable to heat the geothermal fluid 6110 to a temperature that can maintain the operating temperature of the battery-based energy storage system 1000 within the battery-based energy storage system's 1000 operable temperature range. The embodiment also shows that the geothermal fluid 6110 can be returned to a geothermal heat source 3100. In many embodiments, the fluid may circulate through the heat exchange with the battery-based energy storage system, the electricity-generation plant, and return back to the residual heat source.

Figure 17:
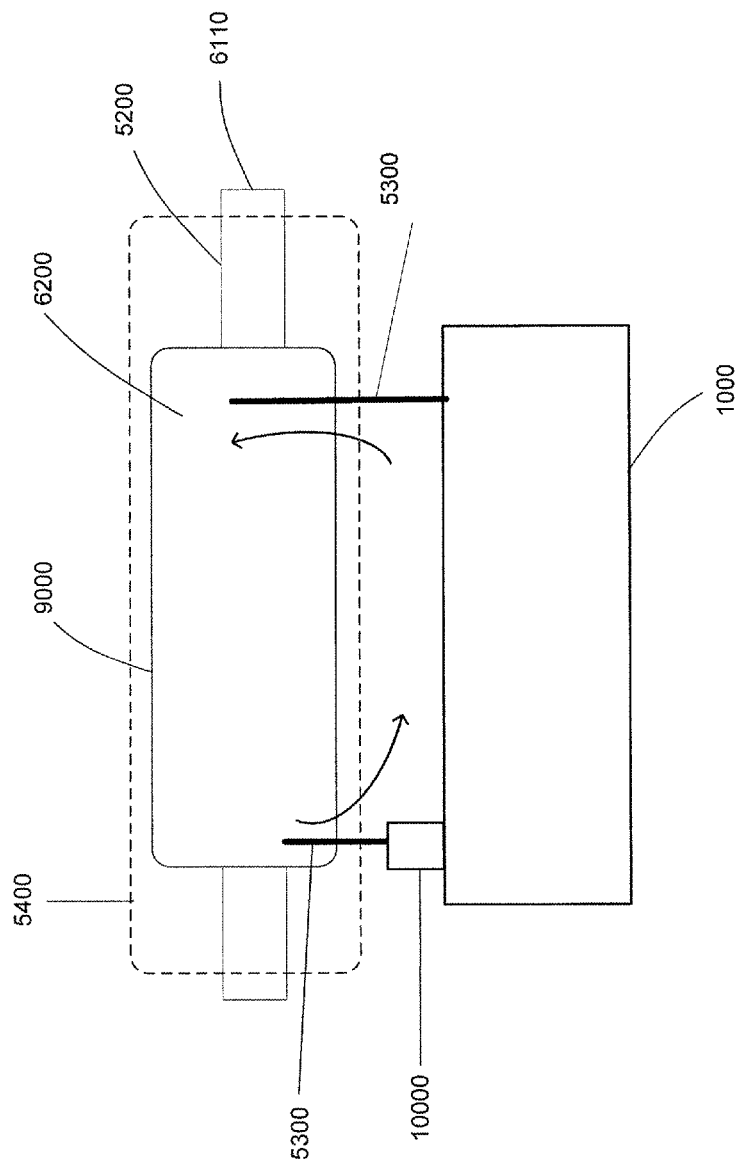
FIG. 17 shows an example of a heat exchanger similar to that in FIG. 12 but adding a supplementary heat source to further regulate the temperature of the fluid.

FIG. 17 provides an example of a supplementary heat source 10000 used to further heat a secondary fluid 6200. Here, the supplementary heat source 10000 transfers heat to the secondary fluid 6200 with a second heat exchanger 9000 after the transfer of heat at the first heat exchanger 9000 that transfers heat from a geothermal fluid 6110. Again, the terms first and second are used for reference purposes only. The amount of heat transferred at the second heat exchanger 9000 can depend on many factors as discussed before, including, without limits, the temperature of the geothermal fluid, the loss of heat after a first heat exchanger, the types of fluids used, and the temperature of the battery-based energy storage system.

Figure 18:
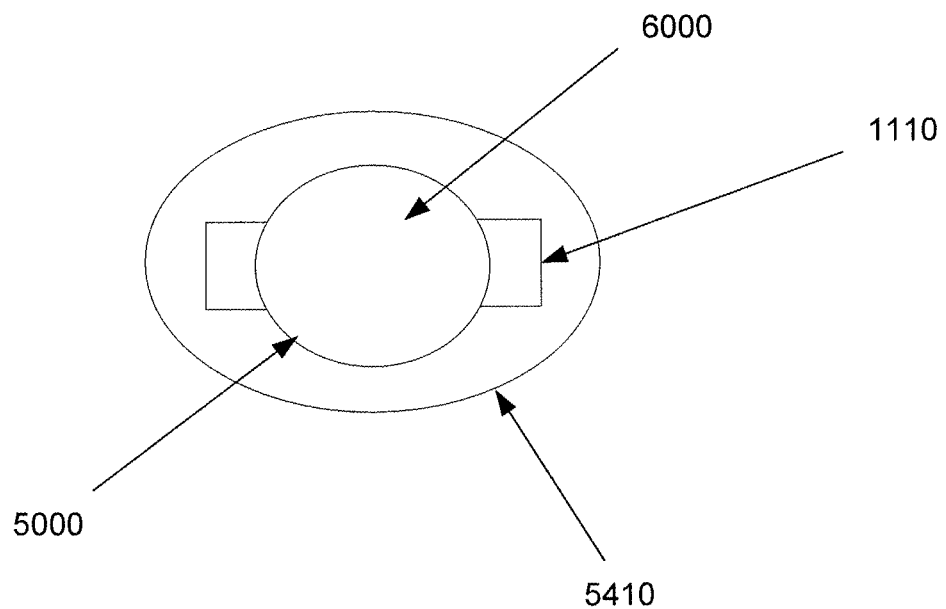
FIG. 18 shows a system wherein the battery cells of the battery-based energy storage system are connected directly to a fluid conduit for the heat exchange.

Referring now to FIG. 18, an example of a heat conduit 5000 is shown. In this particular example, the heat conduit 5000 uses a non-conductive thermal insulation 5410 to assist in regulating the temperature of the fluid 6000. The type of insulation can depend on similar factors as those described above, including, without limits, the temperature of the fluid and the conduit material. Long, insulated heat conduits 5000 are often used to run fluid from a geothermal well to a geothermal power plant 2110. FIG. 18 shows a particular embodiment where battery cells 1110 that make up the battery-based energy storage system 1000 are placed between the heat conduit 5000 and the conduit insulator 5400. Battery cells 1110 can be held in place on the heat conduit 5000, for example by a harness. Battery cells 1110 can be connected in either series or parallel to form a battery array 1100. As the battery array 1100 is charged or discharged, heat from the self-heating of the battery cells is absorbed by the heat conduit 5000 and the fluid 6000. In the case of geothermal power plant operation the self-heating is used to increase geothermal power plant output or heat the geothermal reservoir upon return of the geothermal fluid. When the self-heating of the battery cells would otherwise be insufficient to maintain the battery cells at the desired temperature, the battery cells can absorb heat from the heat conduit. Almost no heat (i.e., energy) is lost in such a system.

In geothermal power plants and fossil energy collection systems, such as oil and gas wells, pipe lines carrying high temperature fluids can extend for miles. With some sodium-sulfur battery designs, about 115 cells in series can create 480V. With an example 20 amp/hour cell that requires about 2.5 inches, 24 feet of pipe, according to one embodiment, would provide about 10 KW per row of attached battery cells 1110. Geothermal power plants commonly use 22-inch diameter pipe. On average, a pipe might be ½ mile long. Assuming two rows of battery cells 1110, a system according to one embodiment would provide about 2 MW of energy storage.

Figure 19:
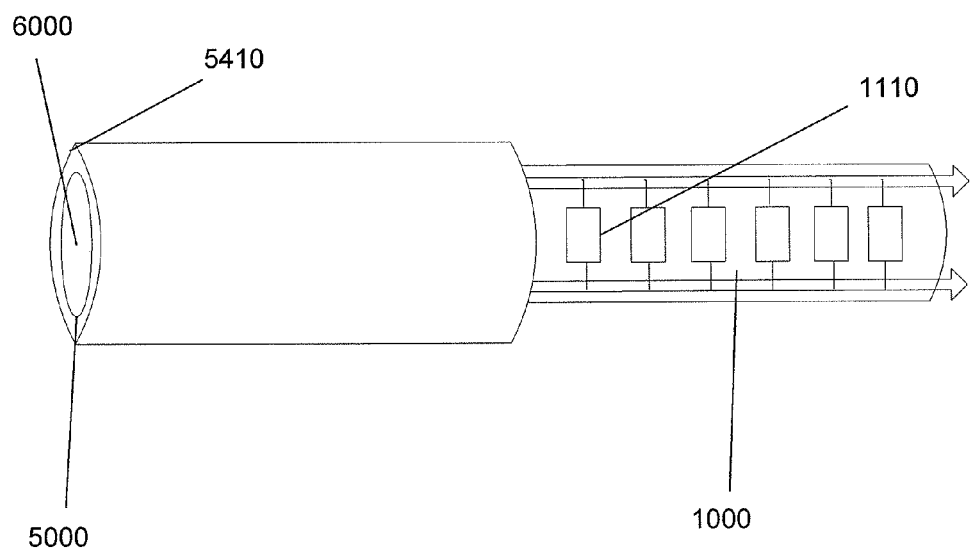
FIG. 19 shows another view of the system as in FIG. 18 and where the conduit is used as a conductor for the battery cells.

FIG. 19 shows a similar embodiment which also illustrates that the conduit 5000 can also serve as a conductor between battery cells 1110. The embodiments as in FIGS. 18 and 19 could be useful where the temperature of the fluid 6000 was within the operable temperature range of the battery-based energy storage system 1000. In this scenario, the battery-based energy storage system 1000 could continuously charge and discharge without risk of overheating or freezing. Because the fluid 6000 temperature is between the overheating and freezing temperatures of the battery-based energy storage system 1000, the operating temperature of the battery-based energy storage system 1000 can always be maintained between them. Where the fluid 6000 temperature is below that of the battery-based energy storage system 1000, the charging and discharging of the battery-based energy storage system 1000 would transfer heat to the fluid 6000. This further heating of the fluid 6000 is an additional benefit to a geothermal power plant 2110, which is powered by the heat from a geothermal heat source 3100. Furthermore, such an embodiment would require little alteration of an existing geothermal power plant.

Figure 20:
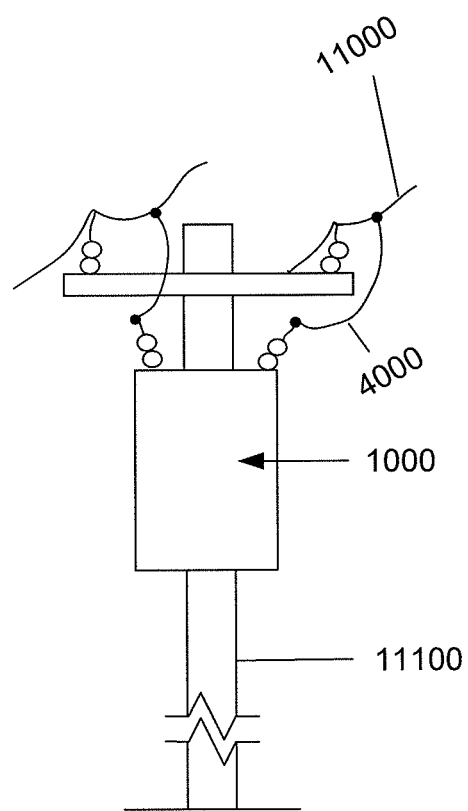
FIG. 20 shows a system wherein the battery-based energy storage system is mounted to a power pole to serve as a backup energy source to a power grid.

FIG. 20 shows an embodiment where a battery array 1100 is used in connection with a power electronics 1200 using high-temperature electronics. The power electronics 1200 operate as a residual heat source to aid in maintaining the temperature of the battery array 1100. As added benefits, the battery array 1100 requires less external heating and the power electronics 1200 are exposed to the elevated temperature of the battery array 1100. Here the power electronics 1200 must operate under continuous elevated temperatures. Such high-temperature power electronics, like those developed for aircraft engines and geothermal well monitoring, are capable of a long operating life times under harsh conditions.

As illustrated in FIG. 20, a further benefit include a smaller battery-based energy storage system 1000 as a result of placing the power electronics 1200 in the same enclosure as the battery array 1100. The smaller system can be placed in locations not currently available to existing battery-based energy storage systems 1000. In this particular embodiment, the battery-based energy storage system 1000 can be placed on a power pole within a residential area.

Figure 21:
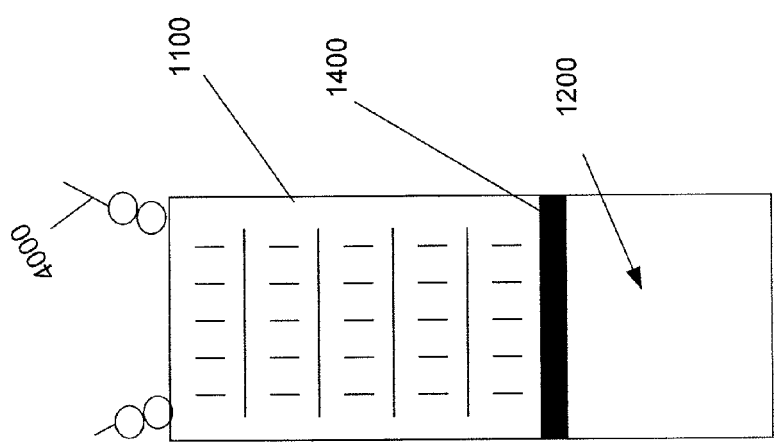
FIG. 21 shows the detail of the battery-based energy storage system as used in FIG. 20 where the power electronics, serving as a residual heat source, are below the vertical battery cells in the battery array with a thermal conductor between them.

As illustrated in FIG. 21, placing the power electronics 1200 below the battery array 1100 also provides the best heat exchange. A thermal conductor 1400 can be place between the battery array 1100 and the power electronics 1200 to operate as a heat exchanger.

Figure 22:
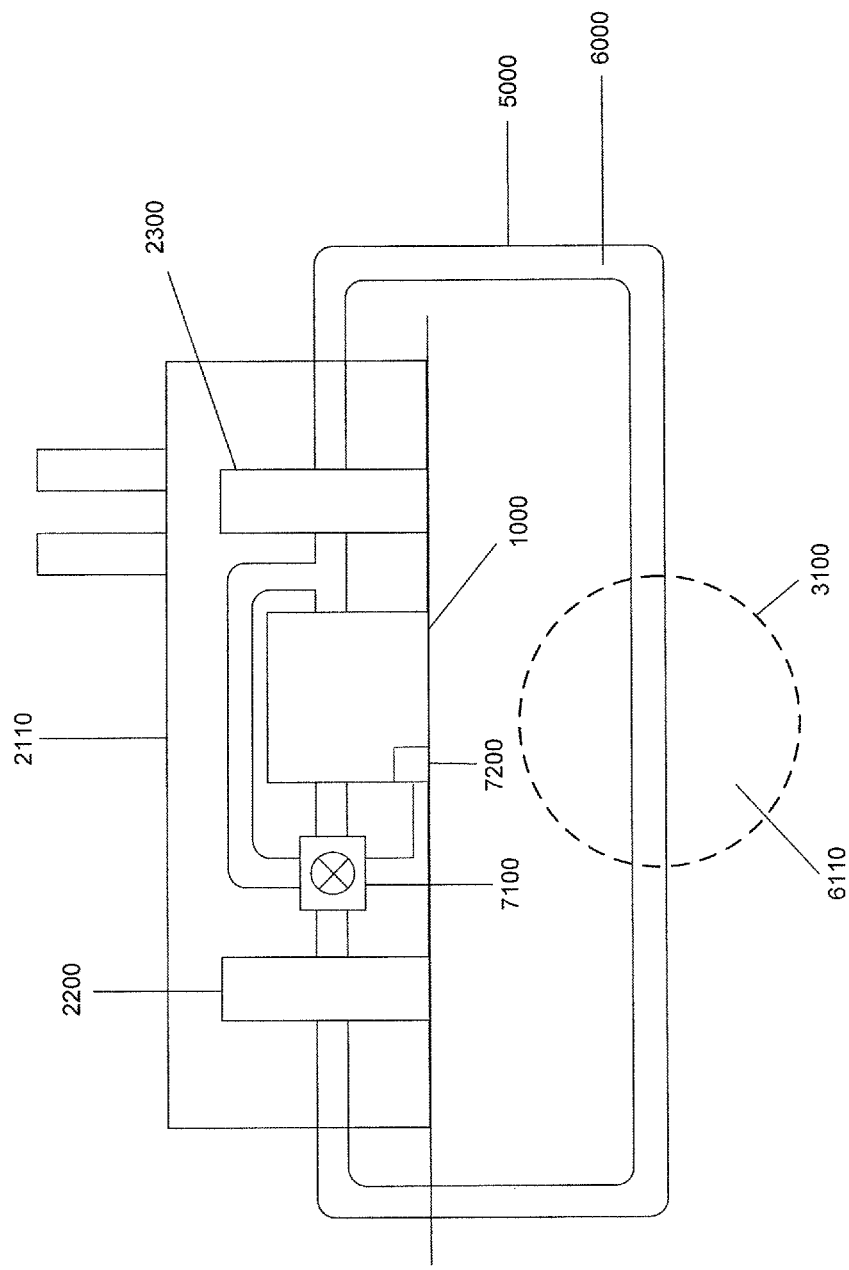
FIG. 22 shows a system similar to that in FIG. 5 but with the battery-based energy storage system between stages of the geothermal power plant where the heat exchange is more appropriate after some heat is removed from the fluid and a control unit that regulates the fluid flow to the battery-based energy storage system.

Referring now to FIG. 22, it shows yet another embodiment of the present invention. In some instances the temperature of a fluid 6000 in the heat conduit 5000 as it exits the geothermal heat source 3100 may be sufficiently high that it would be beneficial to reduce the temperature before using with a battery-based energy storage system 1000. Likewise, for some geothermal power plants 3100 it is advantageous to use a two, or more, stage turbine for extracting and converting heat into electricity. In FIG. 22 a battery-based energy storage system 1000 is placed in-between a first stage 2200 and a second stage 2300 of a turbine in a geothermal power plant 2110. Those of skill in the art will understand that a battery-based storage system may similarly be placed between any stage in a multi-stage turbine, or between any phase in a multiple phase heat-to-electricity conversion system. In FIG. 22, a control unit 7100 is used to regulate flow through the battery-based energy storage system 1000 or around the battery-based energy storage system 1000. In some embodiments, a heat exchanger as described in relation to FIGS. 12-15 may be used. In yet another embodiment, a control unit may be used with a heat exchanger in order to control the flow rate of a secondary fluid.

In conclusion, the present invention provides, among other things, a system and method for managing the operating temperature of a battery-based energy storage system. Those skilled in the art can readily recognize that numerous variations, combinations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A thermal management system for a battery-based energy storage system, the thermal management system comprising:
    a residual heat source;
    a battery-based energy storage system thermally connected to and configured to receive or remove heat from the residual heat source;
    a fluid circulation system connected to the battery-based energy storage system and configured to cool the battery-based energy storage system; and
    a heat-to-electricity converter added to the fluid circulation system and configured to generate electricity using heat removed from the battery-based energy storage system.

2. The thermal management system of claim 1, wherein the residual heat source is a geothermal heat source.

3. The thermal management system of claim 1, wherein the residual heat source is a steam-producing power-generating heat source.

4. The thermal management system of claim 1, wherein the battery-based energy storage system comprises:
   a battery array; and
   power electronics for charging and discharging the battery array.

5. The thermal management system of claim 1, further comprising:
   a heat conduit, wherein the heat conduit is thermally connected to the residual heat source and the battery-based energy storage system.

6. The thermal management system of claim 5, wherein the heat conduit further comprises:
   a first fluid conduit, thermally connected to the residual heat source; and
   a second fluid conduit, thermally connected to the energy storage system,
   wherein the first fluid conduit is thermally connected to the second fluid conduit.

7. The thermal management system of claim 5, further comprising:
   a control system for controlling circulation of a fluid in the heat conduit to regulate the temperature of the battery-based energy storage system.

8. A thermal management system for a battery-based energy storage system, the thermal management system comprising:
   a residual heat source including a steam-producing power-generating heat source, the residual heat source having a source temperature;
   a battery-based energy storage system thermally connected to the residual heat source via a heat conduit, the battery-based energy storage system having an operating temperature and an operable temperature range;
   a heat-to-electricity converter added to the heat conduit and configured to generate electricity using heat removed from the battery-based energy storage system; and
   a control system for controlling circulation of a fluid in the heat conduit to regulate a temperature of the battery-based energy storage system,
   wherein the control system is configured to control the circulation of the fluid from the residual heat source to the battery-based energy storage system based on at least one of (a) the operating temperature of the battery-based energy storage system, (b) the operable temperature range of the battery-based energy storage system, (c) the source temperature of the residual heat source, (d) electrical current requirements of the battery-based energy storage system, and (e) power demands on the battery-based energy storage system.

9. The thermal management system of claim 7, wherein:
   the battery-based energy storage system has an operating temperature and an optimal temperature;
   the residual heat source has a source temperature; and
   wherein the control system is configured to control the circulation of the fluid from the residual heat source to the battery-based energy storage system based on at least one of (a) the operating temperature of the battery-based energy storage system, (b) the optimal temperature of the battery-based energy storage system, and (c) the source temperature of the residual heat source.

10. The thermal management system of claim 9, wherein the source temperature of the residual heat source is above the optimal temperature of the battery-based energy storage system, and the control system is configured to circulate the fluid from the residual heat source to the battery-based energy storage system when the operating temperature of the battery-based energy storage system is below the optimal temperature of the battery-based energy storage system.

11. The thermal management system of claim 5, further comprising:
   a geothermal power plant, wherein the heat conduit is thermally connected to the geothermal power plant.

12. The thermal management system of claim 1, further comprising:
   a first fluid path from the residual heat source to a geothermal power plant;
   a second fluid path from the geothermal power plant to the residual heat source; and
   a first control unit to control circulation of a fluid from the first fluid path to the battery-based energy storage system before the geothermal power plant; and
   a second control unit to control circulation of the fluid from the second fluid path to the battery-based energy storage system before the residual heat source.

13. The thermal management system of claim 12, wherein the first control unit and the second control unit are part of a control system.

14. The thermal management system of claim 5, wherein:
   the battery-based energy storage system comprises:
      a battery array; and
      power electronics for charging and discharging the battery array;
   the heat conduit is thermally connected to the battery array.

15. The thermal management system of claim 14, wherein the heat conduit is thermally connected to the power electronics, the thermal management system further comprising:
   a control system for controlling circulation of a fluid in the heat conduit to regulate the temperature of the battery array and the power electronics.

16. A thermal management system for a battery-based energy storage system, the thermal management system comprising:
   a battery-based energy storage system;
   a geothermal heat source thermally connected to and configured to receive or remove heat from the battery-based energy storage system to regulate an operating temperature of the battery-based energy storage system;
   a fluid circulation system connected to the battery-based energy storage system and configured to cool the battery-based energy storage system; and
   a heat-to-electricity converter added to the fluid circulation system and configured to generate electricity using heat removed from the battery-based energy storage system.

17. The thermal management system of claim 16, wherein the battery-based energy storage system is located at least partially within the geothermal heat source.

18. The thermal management system of claim 16, further comprising:
   a supplemental heat source thermally connected to the battery-based energy storage system.

19. The thermal management system of claim 16, further comprising:
   a heat conduit thermally connected to the battery-based energy storage system and the geothermal heat source.

20. The thermal management system of claim 19, wherein the heat conduit further comprises:
   a first fluid conduit, thermally connected to the residual heat source; and
   a second fluid conduit, thermally connected battery-based to the energy storage system, wherein the first fluid conduit is thermally connected to the second fluid conduit.

21. The thermal management system of claim 19, further comprising:
a control system configured to control fluid flow in the heat conduit to regulate temperature of the battery-based energy storage system.

* * * * *